United States Patent [19]
Fabian et al.

[11] Patent Number: 5,300,391
[45] Date of Patent: Apr. 5, 1994

[54] FIELD ASSISTED PROCESSES FOR PREPARING IMAGING MEMBERS

[75] Inventors: Ellis Fabian, North York, Canada; Eugene A. Swain; John J. Darcy, both of Webster, N.Y.

[73] Assignee: Xerox Corporation, Stamford, Conn.

[21] Appl. No.: 762,812

[22] Filed: Sep. 17, 1991 (Under 37 CFR 1.47)

[51] Int. Cl.⁵ .................... B29C 5/04; B29C 39/08
[52] U.S. Cl. .................... 430/127; 264/24; 264/126
[58] Field of Search .......... 264/24, 126, 310; 430/127

[56] References Cited

U.S. PATENT DOCUMENTS

| | | | |
|---|---|---|---|
| 2,874,412 | 2/1959 | Flemming et al. | 18/39 |
| 3,184,525 | 5/1965 | Brandt | 264/127 |
| 3,246,069 | 4/1966 | Maynard | 264/255 |
| 3,280,232 | 10/1966 | Lander et al. | 264/71 |
| 3,290,426 | 11/1966 | Barrentine | 174/47 |
| 3,439,079 | 4/1969 | McDowell | 264/102 |
| 3,542,912 | 11/1970 | Rielly et al. | 264/241 |
| 3,551,551 | 11/1970 | Hugi | 264/311 |
| 3,652,368 | 3/1972 | Formo | 156/501 |
| 3,666,528 | 5/1972 | Barnhardt | 117/49 |
| 3,673,296 | 6/1972 | Timko | 264/24 |
| 3,714,312 | 1/1973 | Nitta et al. | 264/108 |
| 3,966,870 | 6/1976 | Vecchiotti | 264/255 |
| 3,976,821 | 8/1976 | Carrow et al. | 428/474 |
| 4,022,855 | 5/1977 | Hamblen | 264/1 |
| 4,107,254 | 8/1978 | Webster et al. | 264/270 |
| 4,138,524 | 2/1979 | Darroch | 428/217 |
| 4,183,883 | 1/1980 | Blair | 264/40.1 |
| 4,394,340 | 7/1983 | Tarumi et al. | 264/219 |
| 4,548,779 | 10/1985 | Steinberg et al. | 264/255 |
| 4,808,364 | 2/1989 | Blunt et al. | 264/310 |
| 4,957,683 | 9/1990 | Hartmann | 264/256 |
| 5,035,850 | 7/1992 | Yoshikawa et al. | 264/256 |
| 5,037,600 | 4/1990 | Upchurch | 264/256 |
| 5,096,627 | 3/1992 | Vogelgesang | 264/1.9 |

FOREIGN PATENT DOCUMENTS

| | | |
|---|---|---|
| 50-29935 | 9/1975 | Japan ............ 264/4 |
| 1202811A | 8/1988 | Japan . |
| 2047014A | 10/1988 | Japan . |
| 298349 | 12/1988 | Japan . |
| 2130138 | 5/1984 | United Kingdom . |

*Primary Examiner*—John L. Goodrow
*Attorney, Agent, or Firm*—Judith L. Byorick

[57] ABSTRACT

Disclosed is a process for preparing a multilayered cylindrical article which comprises introducing into a cylindrical mold a composition comprising a liquid, uncured resin material and a magnetically attractable filler material, spinning the mold about its axis, applying a magnetic field to the composition within the mold, thereby attracting the magnetically attractable filler material in the direction dictated by the magnetic field and causing the magnetically attractable filler material and the liquid uncured resin material to separate into layers, and subsequently curing the uncured resin to form a cylindrical article having at least two layers. Subsequent to formation, the multilayered cylindrical article can be coated with additional layers. Further, additional layers can be added to either the inside or outside surface of the cylinder by introducing the additional layer material into the mold and spin casting to form a layer. The cylinders formed by the processes of the present invention can be employed as imaging members in electrographic, ionographic, electrophotographic, and similar imaging processes.

59 Claims, 5 Drawing Sheets

FIELD ASSISTED PROCESSES FOR PREPARING IMAGING MEMBERS

BACKGROUND OF THE INVENTION

The present invention is directed to processes for preparing imaging members. More specifically, the present invention is directed to processes for forming multi-layered polymeric drums or belts by a spin casting process, which drums or belts can subsequently be employed as imaging members or further processed into imaging members. One embodiment of the present invention is directed to a process which comprises introducing into a cylindrical mold a composition comprising a liquid, uncured resin and a magnetically attractable filler material, spinning the mold about its axis, applying a magnetic field to the composition within the mold, thereby attracting the magnetically attractable filler material in the direction dictated by the magnetic field and causing the magnetically attractable filler material and the liquid uncured resin to separate into layers, and subsequently curing the uncured resin to form a cylindrical article having two layers. Another embodiment of the present invention is directed to a process which comprises introducing into a cylindrical mold a composition comprising a liquid, uncured resin and a magnetically attractable filler material of a density higher than that of the uncured resin, spinning the mold about its axis while applying a magnetic field from inside the mold, thereby attracting the higher density magnetically attractable material toward the inside diameter of the mold, and subsequently curing the uncured resin to form a cylindrical article having two layers, wherein the innermost layer comprises the magnetically attractable material of higher density.

The formation and development of images on the surface of photoconductive materials by electrostatic means is well known. The basic electrophotographic imaging process, as taught by C. F. Carlson in U.S. Pat. No. 2,297,691, entails placing a uniform electrostatic charge on a photoconductive imaging member, exposing the imaging member to a light and shadow image to dissipate the charge on the areas of the imaging member exposed to the light, and developing the resulting electrostatic latent image by depositing on the image a finely divided electroscopic material known as toner. The toner will normally be attracted to those areas of the imaging member which retain a charge, thereby forming a toner image corresponding to the electrostatic latent image. This developed image may then be transferred to a substrate such as paper. The transferred image may subsequently be permanently affixed to the substrate by heat, pressure, a combination of heat and pressure, or other suitable fixing means such as solvent or overcoating treatment.

The formation and development of electrostatic latent images on dielectric receivers is also known. These processes typically employ an imaging member comprising a conductive layer and an insulating dielectric layer. A charge pattern is applied to the dielectric layer in imagewise fashion with an ionographic or electrographic writing head, and the charge image is then developed with toner. Further details regarding ionographic processes are disclosed in, for example, U.S. Pat. No. 3,564,556, U.S. Pat. No. 3,611,419, U.S. Pat. No. 4,240,084, U.S. Pat. No. 4,569,584, U.S. Pat. No. 2,919,171, U.S. Pat. No. 4,524,371, U.S. Pat. No. 4,619,515, U.S. Pat. No. 4,463,363, U.S. Pat. No. 4,254,424, U.S. Pat. No. 4,538,163, U.S. Pat. No. 4,409,604, U.S. Pat. No. 4,408,214, U.S. Pat. No. 4,365,549, U.S. Pat. No. 4,267,556, U.S. Pat. No. 4,160,257, and U.S. Pat. No. 4,155,093, the disclosures of each of which are totally incorporated herein by reference.

Imaging members for electrophotographic imaging systems comprising selenium alloys vacuum deposited on rigid substrates are known. Imaging members have also been prepared by coating rigid substrates with photoconductive particles dispersed in an organic film forming binder. Coating of rigid drum substrates has been effected by various techniques such as spraying, dip coating, vacuum evaporation, and the like. Flexible organic imaging members can also be manufactured by processes that entail coating a web and thereafter shearing the web into segments which are then formed into belts by welding opposite ends of the sheared web. The resulting welded seam on the imaging member, however, disrupts the continuity of the outer surface of the imaging member, and welded belts are less desirable for electrophotographic imaging systems because the seam forms a weak point in the belt and collects toner and paper debris during cleaning, Particularly with wiper blade cleaning devices. Accordingly, cylindrical drums and seamless belts suitable as substrates for electrophotographic or ionographic imaging members are particularly desirable. Imaging members for ionographic or electrographic imaging systems also preferably are in the form of a cylindrical drum or a seamless belt.

Processes for forming cylinders or belts by centrifugal or spin casting processes are known. The process generally entails rotating a mold or mandrel having a cylindrically shaped cavity about a center axis and introducing a film forming polymer composition in the liquid state into the cavity. The film forming polymer is subsequently solidified to form the desired polymeric tube. Film forming polymer compositions introduced into the cavity can be solidified by any of several drying or curing techniques, including oven drying, infrared lamp drying, vacuum chamber drying, impingement drying, dielectric heating, and the like. If desired, a release coating can be used on the inside of the mold or mandrel, such as silicone resins cured with a catalyst, silicone, oil, fluorocarbon oils and coatings, waxes, fatty acids and salts, hydrocarbon oils, and the like.

U.S. Pat. No. 4,394,340 (Tarumi et al.), the disclosure of which is totally incorporated herein by reference, discloses a process for producing a thin-walled endless belt by centrifugal molding which comprises introducing a liquid curable silicone rubber dissolved in a solvent into a rotating cylindrical mold, hardening the silicone rubber to form a mold surface on the inner surface of the cylindrical mold, and thereafter introducing a thermosetting resin dissolved in a volatile solvent onto the mold surface to form the endless belt.

In addition, U.S. Pat. No. 4,107,254 (Webster et al.), the disclosure of which is totally incorporated herein by reference, discloses a process of lining a pipe with settable material by arranging the pipe with its longitudinal axis inclined at an angle to the horizontal, introducing a selected amount of liquid material into the pipe at a predetermined rate so that the liquid material flows down along the pipe, shifting the pipe to a horizontal position and spinning the pipe about its axis to distribute the material, and continuing to spin the pipe until the material has set.

Additionally, U.S. Pat. No. 3,666,528 (Barnhardt), the disclosure of which is totally incorporated herein by reference, discloses a process for applying filled polyimide compositions in coatings of substantial thickness to internal cylindrical surfaces of compressor housings, labyrinth seal bands and the like. A mixture of a solution of polyimide precursors and talc are centrifugally cast onto a metallic cylindrical surface such that most of the solvent is evaporated and the precursors are partially cured so as to be structurally self sustaining. The rotation of the article to be coated is stopped and the coating is further cured under the pressure of an inert atmosphere such that residual solvent and volatile curing reaction byproducts are evolved without blistering the coating.

Further, U.S. Pat. No. 3,184,525 (Brandt), the disclosure of which is totally incorporated herein by reference, discloses a process for making films of fluorine containing solid polymers which comprises evenly and uniformly distributing a powdered fluorine containing solid polymer over the inside surface of a cylindrical molding drum, rotating the molding drum on its axis at a sufficiently high speed that the powder particles are stationary, heating the powdered polymer in the molding drum during the rotation of the drum to the film forming temperature, subsequently cooling the polymer while continuing rotation of the molding drum, and removing the resulting film from the molding drum.

Additionally, U.S. Pat. No. 4,808,364 (Blunt et al.), the disclosure of which is totally incorporated herein by reference, discloses a method of forming rotationally molded articles without providing significant heating by providing a liquid monomer solution and rotational molding means, the molding means having an inner chamber wall defining an inner chamber and the liquid monomer solution including a catalyst and monomer. The liquid solution is conveyed into the rotational molding means and the rotational molding means is rotated while the solution polymerizes to form an article of polymer.

U.S. Pat. No. 3,714,312 (Nitta et al.), the disclosure of which is totally incorporated herein by reference, discloses a method of manufacturing reinforced pipes made of a material obtained by mixing thermoplastic synthetic resin powder and a fibrous inorganic substance. The material is introduced in a rotatable metal mold in a predetermined quantity and the metal mold is heated externally while it is rotated. The fibrous substance is diffused uniformly in the molten plastic material and aligned in the peripheral direction, and the reinforced pipe is thus produced.

In addition, U.S. Pat. No. 3,439,079 (McDowell), the disclosure of which is totally incorporated herein by reference, discloses a process for preparing a hollow article of a thermoplastic polymer wherein the process requires partially filling a cavity with a thermoplastic polymer and sealing the mold. A vacuum is then applied to the mold cavity and the thermoplastic polymer is heated to a temperature above its melting point while the mold is simultaneously rotated. The vacuum is released while the mold is rotated and the rotation is continued until a smooth continuous coating of the inner surfaces of the mold is obtained. The mold is then cooled and the molded article is removed.

Further, U.S. Pat. No. 3,246,069 (Maynord), the disclosure of which is totally incorporated herein by reference, discloses a process for molding hollow articles of thermoplastic polymers which comprises coating the molding surface of a hollow sectional mold with a continuous thin layer of a plastisol, charging into the mold a thermoplastic material, closing the mold, rotating the mold in a multiplicity of planes, heating the mold to fuse the thermoplastic material and bond the thermoplastic material and the plastisol together, cooling the mold, and removing the article thus formed.

Additionally, U.S. Pat. No. 3,673,296 (Timko), the disclosure of which is totally incorporated herein by reference, discloses a method for electrostatically holding particles along a mold surface by impressing an electrostatic charge on the particles subsequent to their deposit, minimizing disturbance of the deposition stream and sticking of powder in the deposition apparatus. A roll deposition unit and corona bar are employed in association with a rotating mold to form a cylindrical member from powdered plastic material. The unit deposits powder in a strip zone lengthwise of the mold. The corona bar is positioned externally of the roll case, parallel to and coextensive with the roll and closest to the cylindrical mold wall in a plane outside the stream of powder flowing from the roll to the mold wall. When the bar is charged and the mold is grounded, the resultant discharge is largely concentrated outside the stream, minimizing electrostatic effect on particles in the stream.

U.S. Pat. No. 3,542,912 (Rielly et al.) discloses a method for making a multilayered article by rotational casting. A mixture of a plurality of thermoplastics, each having at least a 10° F. difference in melting point from any other thermoplastic in the mixture, is rotatably blended in a mold. Each of the thermoplastics are then melted by heating the mixture to a temperature above the melting point of the highest melting point thermoplastic in the mixture and below the degradation temperature of any of the thermoplastics in the mixture. The mixture of molten thermoplastics is rotated for a time sufficient to achieve a good distribution of material on the inner wall of the mold and the mold is then cooled while rotating to solidify the thermoplastics. The highest melting point thermoplastic is disposed innermost of the article produced, and this material may have a density which is higher than others in the article.

U.S. Pat. No. 4,548,779 (Steinberg et al.) discloses a method of rotationally molding a multi-layered article. The outer layer is first rotationally molded and solidified. An inner polymer layer is fed into the mold cavity and an inner layer is rotationally molded to the inner surface of the outer layer. Preferably, the outer layer and inner layer are thermoplastics. The outer layer polymer has a melting point higher than the inner layer polymer. The outer layer is rotationally molded and cooled to below its melt temperaure but above the melt temperature of the inner layer polymer. The inner layer is then rotationally molded while the outer layer remains solid.

U.S. Pat. No. 3,966,870 (Vecchiotti) discloses a process for preparing hollow, multi-layered plastic structures comprising a layer of thermoplastic polyester material and a layer of polyethylene, the polyethylene and polyester layers being cross-linked together at their interface. The process entails charging a mold with thermoplastic polyester material, rotating and heating the mold so as to fuse and form a layer of the polyester material on the inner surface of the mold, cooling the mold to a point below the melting point of the polyester but above the melting point of a subsequently added cross-linkable polyethylene material, stopping the rotation and charging the mold with the cross-linkable polyethylene material, resuming the rotation of the mold, and heating it to a temperature sufficient to fuse and cross-link the polyethylene with the polyester layer, cooling the mold to a point below the melting point of the polyethylene and removing the finished structure from the mold.

Copending Application U.S. Ser. No. 07/761,128 filed concurrently herewith, entitled "Processes For Preparing Imaging Members," with the named inventors Douglas J. Weatherall, Marion H. Quinlan, and Andrew O. Kenny, the disclosure of which is totally incorporated herein by reference, discloses a process which comprises introducing into a cylindrical mold a composition comprising a liquid, uncured resin material and a filler material of a density different from that of the uncured resin material, spinning the mold about its axis at a speed sufficient to cause separation of the uncured resin material and the filler material into layers, and subsequently curing the uncured resin to form a cylindrical article having at least two layers, wherein the outermost layer comprises the material of higher density. The multilayered cylindrical articles prepared by this process can be employed in several applications. For example, when one layer is electrically conductive and the other is electrically insulating, the article can be employed as an ionographic imaging member or as the conductive substrate layer of an electrophotographic imaging member. Optionally, additional layers can be applied to the cylindrical article by adding additional uncured material of the desired composition to the mold either prior to or subsequent to the curing step, spinning the mold to distribute the additional material on the inner surface of the mold wall, and curing the additional material. Alternatively, additional layers can be added to the cylindrical article prepared by these processes by other conventional coating methods, such as spray coating, dip coating, vacuum evaporation, or the like.

Copending application U.S. Ser. No. 07/761,091 filed concurrently herewith, entitled "Field Assisted Processes For Preparing Imaging Members," with the named inventors Richard J. Manzolati, Marion H. Quinlan, Douglas J. Weatherall, and Andrew O. Kenny, the disclosure of which is totally incorporated herein by reference, discloses a process which comprises introducing into a cylindrical mold a fluid photoconductive material, spinning the mold about its axis at a speed sufficient to distribute the photoconductive material substantially uniformly along the inner surface of the mold, introducing into the cylindrical mold a fluid electrically conductive material, spinning the mold about its axis at a speed sufficient to distribute the electrically conductive material substantially uniformly along the inner surface of the mold, and causing the photoconductive material and the electrically conductive material to solidify, thereby forming a cylindrical imaging member having an electrically conductive layer and a photoconductive layer. Optionally, additional layers can be added to the cylindrical article prepared by this process, either by introducing a fluid comprising the material from which the desired layer is to be formed and spinning the mold about its axis to distribute the material along the inner surface of the mold and thereafter causing the material to solidify, or by other conventional coating methods, such as spray coating, dip coating, vacuum evaporation, or the like.

Although known processes are suitable for their intended purposes, a need remains for processes for preparing drums and belts suitable for electrophotographic and ionographic applications. In addition, a need continues to remain for processes for preparing multilayer drums and belts having a high degree of uniformity in the thickness of the layers. Further, there is a need for processes for preparing multilayer drums and belts wherein the outer layer has excellent surface finish characteristics. There is also a need for inexpensive processes for preparing multilayer drums and belts. Additionally, a need continues to exist for processes for preparing multilayer drums and belts having a high degree of dimensional uniformity. Further, a need exists for processes for preparing multilayer drums and belts containing a wide variety of filler materials in a wide range of filler concentrations. In addition, there is a need for processes for preparing multilayer drums and belts with low stresses, high temperature stability, rigidity, and solvent resistant characteristics. A need also exists for processes for preparing multilayer drums and belts from mixtures of materials having similar densities wherein one of the materials is magnetically attractable. Further, a need exists for processes for preparing multilayer drums and belts wherein the inner layer is magnetically attractable and is of a higher density than the material constituting the outer layer. A need also exists for processes for preparing multi-layered drums and belts wherein one of the layers contains a magnetically attractable material distributed within a matrix material in a graded, non-uniform density.

SUMMARY OF THE INVENTION

It is an object of the present invention to provide processes for preparing drums and belts suitable for electrophotographic and ionographic applications.

It is another object of the present invention to provide processes for preparing multilayer drums and belts having a high degree of uniformity in the thickness of the layers.

It is yet another object of the present invention to provide processes for preparing multilayer drums and belts wherein the outer layer has excellent surface finish characteristics.

It is still another object of the present invention to provide inexpensive processes for preparing multilayer drums and belts.

Another object of the present invention is to provide processes for preparing multilayer drums and belts having a high degree of dimensional uniformity.

Yet another object of the present invention is to provide processes for preparing multilayer drums and belts containing a wide variety of filler materials in a wide range of filler concentrations.

Still another object of the present invention is to provide processes for preparing multilayer drums and belts with low stresses, high temperature stability, rigidity, and solvent resistant characteristics.

Another object of the present invention resides in providing processes for preparing multilayer drums and belts from mixtures of materials having similar densities wherein one of the materials is magnetically attractable.

Yet another object of the present invention resides in providing processes for preparing multilayer drums and belts wherein the inner layer is magnetically attractable and is of a higher density than the material constituting the outer layer.

Still another object of the present invention is to provide processes for preparing multi-layered drums and belts wherein one of the layers contains a magnetically attractable material distributed within a matrix material in a graded, non-uniform density.

These and other objects of the present invention (or specific embodiments thereof) can be achieved by providing a process which comprises introducing into a cylindrical mold a composition comprising a liquid, uncured resin and a magnetically attractable filler material, spinning the mold about its axis, applying a magnetic field to the composition within the mold, thereby attracting the magnetically attractable filler material in the direction dictated by the magnetic field and causing the magnetically attractable filler material and the liquid uncured resin to separate into layers, and subsequently curing the uncured resin to form a cylindrical article having at least two layers. Another embodiment of the present invention is directed to a process which comprises introducing into a cylindrical mold a composition comprising a liquid, uncured resin and a magnetically attractable filler material of a density higher than that of the uncured resin, spinning the mold about its axis while applying a magnetic field from inside the mold, thereby attracting the higher density magnetically attractable material toward the inside diameter of the mold, and subsequently curing the uncured resin to form a cylindrical article having at least two layers, wherein the innermost layer comprises the magnetically attractable material of higher density. The multilayered cylindrical articles prepared by these processes can be employed in several applications. For example, when one layer is electrically conductive and the other is electrically insulating, the article can be employed as an ionographic imaging member or as the conductive substrate layer of an electrophotographic imaging member. Optionally, additional layers can be applied to the cylindrical article by adding additional uncured material of the desired composition to the mold subsequent to or prior to the curing step, spinning the mold to distribute the additional material on the inner surface of the mold wall, and curing the additional material. Alternatively, additional layers can be added to the cylindrical article prepared by these processes by other conventional coating methods, such as spray coating, dip coating, vacuum evaporation, or the like.

DETAILED DESCRIPTION OF THE INVENTION

Figure 1:
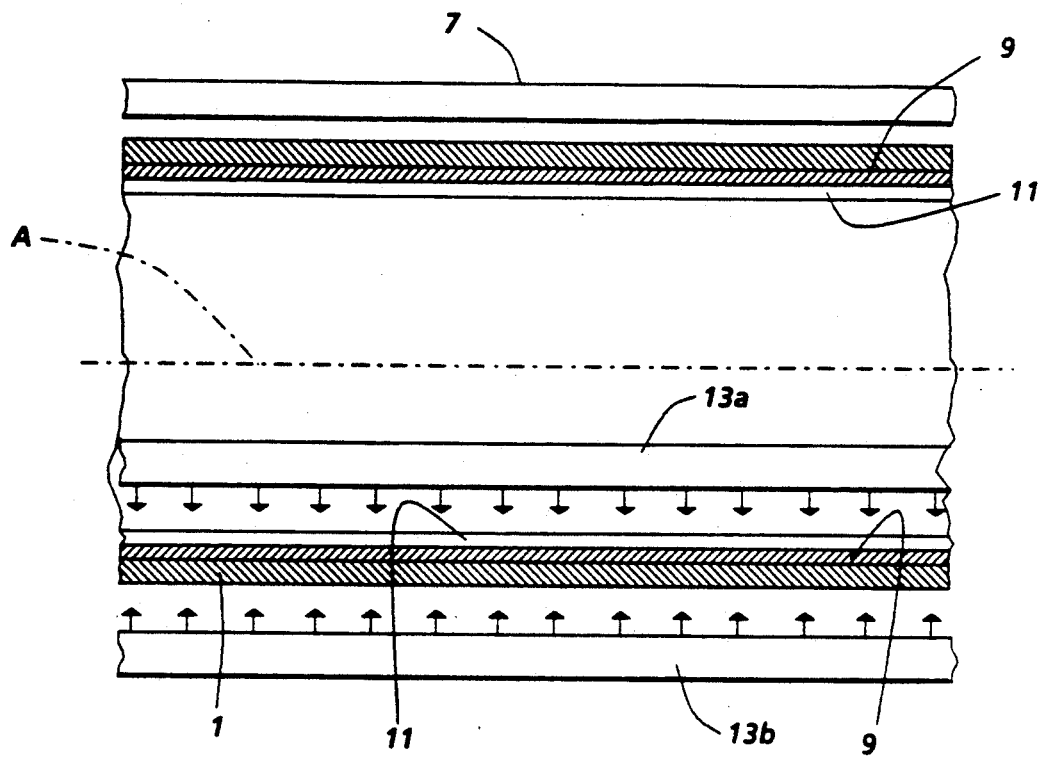
FIGS. 1, 2, and 3 illustrate schematically apparatuses suitable for some embodiments of the present invention, wherein a field is applied to the outside diameter of a mold.

The processes of the present invention entail the formation of multilayered cylinders by spinning about its axis a cylindrical mold containing a composition comprising at least two materials and causing the separation of at least two of the materials into layers, followed by curing the composition. The resulting article exhibits at least partial separation into layers of the magnetically attractable material and the other material; the separation can be into substantially discrete layers, wherein the interface between the layer of magnetically attractable material and the layer containing no magnetically attractable material is well defined, or the separation can be graded, wherein the concentration of magnetic material within the final article increases across the thickness of the article, resulting in one surface (for example, the outside surface) comprising substantially nonmagnetic material, the other surface (for example, the inside surface) comprising magnetic material, and the concentration of magnetic material increasing across the article thickness (for example, from the outside surface toward the inside surface). One of the materials is in the liquid state and is curable by any suitable process, such as application of heat or ultraviolet light, chemical means such as the application of a catalyst, or any other suitable curing means, such as exposure to visible light, ion beam radiation, electron beam radiation, or the like. Typical materials include liquid uncured resins, such as unsaturated polyester resins, including isophthalic polyester resins with styrene monomer as crosslinking agent, isophthalic polyester resins with diallyl phthalate monomer as crosslinking agent, isophthalic polyester resins with vinyl toluene monomer as crosslinking agent, orthophthalic polyester resins with styrene monomer as crosslinking agent, orthophthalic polyester resins with diallyl phthalate monomer as crosslinking agent, orthophthalic polyester resins with vinyl toluene monomer as crosslinking agent, and the like; vinyl ester resins, such as bisphenol-A methacrylate resins with styrene monomer as crosslinking agent, bisphenol-A methacrylate resins with diallyl phthalate monomer as crosslinking agent, bisphenol-A methacrylate resins with vinyl toluene monomer as crosslinking agent, bisphenol-A acrylate resins with styrene monomer as crosslinking agent, bisphenol-A acrylate resins with diallyl phthalate monomer as crosslinking agent, bisphenol-A acrylate resins with vinyl toluene monomer as crosslinking agent, and the like; epoxy resins; phenolic resins; polyimide resins; polyamide resins; and the like, as well as mixtures thereof. Any other suitable curable material can also be employed in the process of the present invention. Typically, the curable liquid has a viscosity of from about 1 to about 100,000 centipoise, and preferably from about 500 to about 6,000 centipoise, although the viscosity can be outside of this range.

The liquid material generally contains a polymerization initiator. An initiator is useful for forming free radicals to initiate polymerization of the liquid material within the mold; while an initiator is not required, polymerization by processes such as heating in the absence of an initiator can consume large amounts of time, thus rendering such processes economically undesirable. Examples of initiators include peroxide initiators, such as methyl ethyl ketone peroxide, benzoyl peroxide, t-butyl perbenzoate, or the like, as well as mixtures thereof, which generally function as chemical or thermal initiators, as well as photoinitiators, such as dicyclopentadienyl titanium dichloride. Initiators can be present in any effective amount; typically, the initiator is present in an amount of from about 1 to about 2 percent by weight of the liquid. In addition, the liquid can contain polymerization promoters or accelerators, such as cobalt octoate, cobalt naphthenate, dimethyl aniline, diethyl aniline, or the like, as well as mixtures thereof. A polymerization initiator is useful for accelerating breakdown of the initiator, thus speeding initiation of polymerization. Polymerization promoters or accelerators can be present in any effective amount; typically the promoter or accelerator is present in an amount of from about 0.10 to about 0.25 percent by weight of the liquid.

The liquid material contains at least one additional material or filler material. In the processes of the present invention, the filler material is magnetically attractable and application of a magnetic field to the composition within the mold during the casting process causes the filler material and the liquid uncured resin to separate into physically and/or functionally distinct layers. The filler material can be of a density similar to that of the uncured resin. In addition, the filler can also be of a density different from that of the uncured resin, and the application of a magnetic field can cause the filler material to migrate through the liquid uncured resin in a direction opposite to that which would be caused by centrifugal forces provided that, on average per rotational cycle, the strength of the magnetic field applied is greater than centrifugal forces existing in the mold during spinning. For example, a mixture comprising a liquid uncured resin and a magnetically attractable filler material of a density higher than that of the resin can be separated into two layers, wherein the higher density magnetically attractable filler material forms the inner layer, by applying the field from within the mold to the inner diameter of the composition within the mold. Similarly, a mixture comprising a liquid uncured resin and a magnetically attrarctable filler material of a density lower than that of the resin can be separated into two layers, wherein the lower density magnetically attractable filler material forms the outer layer, by applying the field from outside the mold to the outer diameter of the composition within the mold.

Examples of suitable filler materials include particles or fibers of metals such as nickel, iron, cobalt, and the like, magnetic metallic alloys such as steels containing tungsten, chromium, cobalt, molybdenum, or the like, alloys of nickel, aluminum, and iron, alloys of cobalt and copper, alloys of copper, nickel, and iron, alloys of copper, nickel, and cobalt, alloys of cobalt, vanadium, and iron, and the like, magnetic metallic oxides such as ferrous oxide, ferric oxide, barium ferrite ($BaFe_{12}O_{19}$), other ferrites such as materials of the formula $R_3Fe_5O_{12}$, wherein R is a rare earth element such as yttrium, spinel structured ferrites of the formula $MFe_2O_4$, wherein M is a metal such as nickel, manganese, magnesium, zinc, copper, cobalt, or a mixture thereof, and the like, intermetallic compounds, such as those of the formula $RCo_5$, wherein R can be yttrium, lanthanum, cerium, praseodymium, or samarium, carbon, glass, ceramic materials, other materials such as silicon carbide, spheresor fibers of materials such as glass, ceramic materials, carbon, or the like coated with magnetic materials such as nickel, magnetic alloys, or any other suitable coating material, and mixtures thereof. Further information and examples of magnetic materials is disclosed in, for example, *Metals Reference Book*, 5th Ed., C. Smithells, Ed., Butterworths, London & Boston (1976), the disclosure of which is totally incorporated herein by reference.

The process of the present invention entails the formation of a cylindrical article by spinning about its axis a cylindrical mold containing a composition comprising a liquid, uncured resin and particles of magnetically attractable filler material while applying a magnetic field to either the outside or the inside diameter of the composition within the mold, with the field being of sufficient magnitude to cause the magnetically attractable particles to be driven in a direction as directed by the magnetic field. This embodiment of the present invention enables formation of a multilayered cylinder wherein the materials that comprise the separate layers are sufficiently close to each other in density that it would be difficult or impossible to cause them to separate into distinct layers by a spin casting process unassisted by field effects. In addition, this process can enhance the separation of materials that differ in density.

In one embodiment, the process of the present invention entails the formation of a cylindrical article by spinning about its axis a cylindrical mold containing a composition comprising a liquid, uncured resin and particles of magnetically attractable filler material of a density greater than that of the resin while applying a magnetic field from inside the mold to the inside diameter of the composition within the mold, with the field being of sufficient magnitude to cause the magnetically attractable particles to be driven toward the inside diameter. This embodiment of the present invention enables formation of a multilayered cylinder wherein the inner layer contains material of a density higher than the material comprising the outer layer. The applied magnetic field counteracts and overcomes, at least on average per rotational cycle, centrifugal forces that otherwise could cause the filler particles to aggregate at the outer diameter of the mold.

Figure 2:
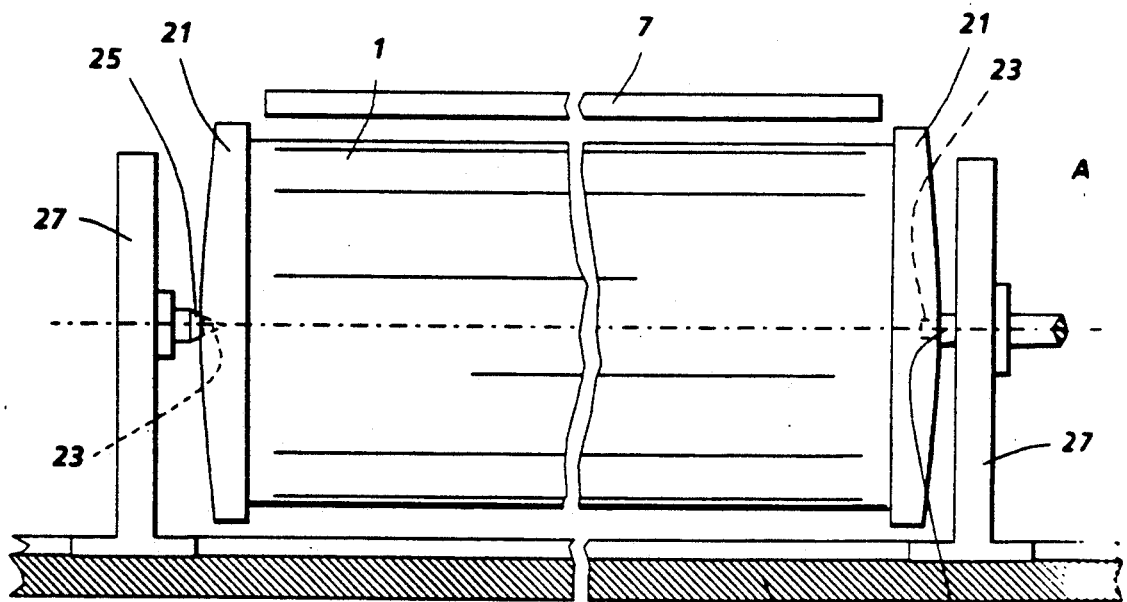
Figure 3:
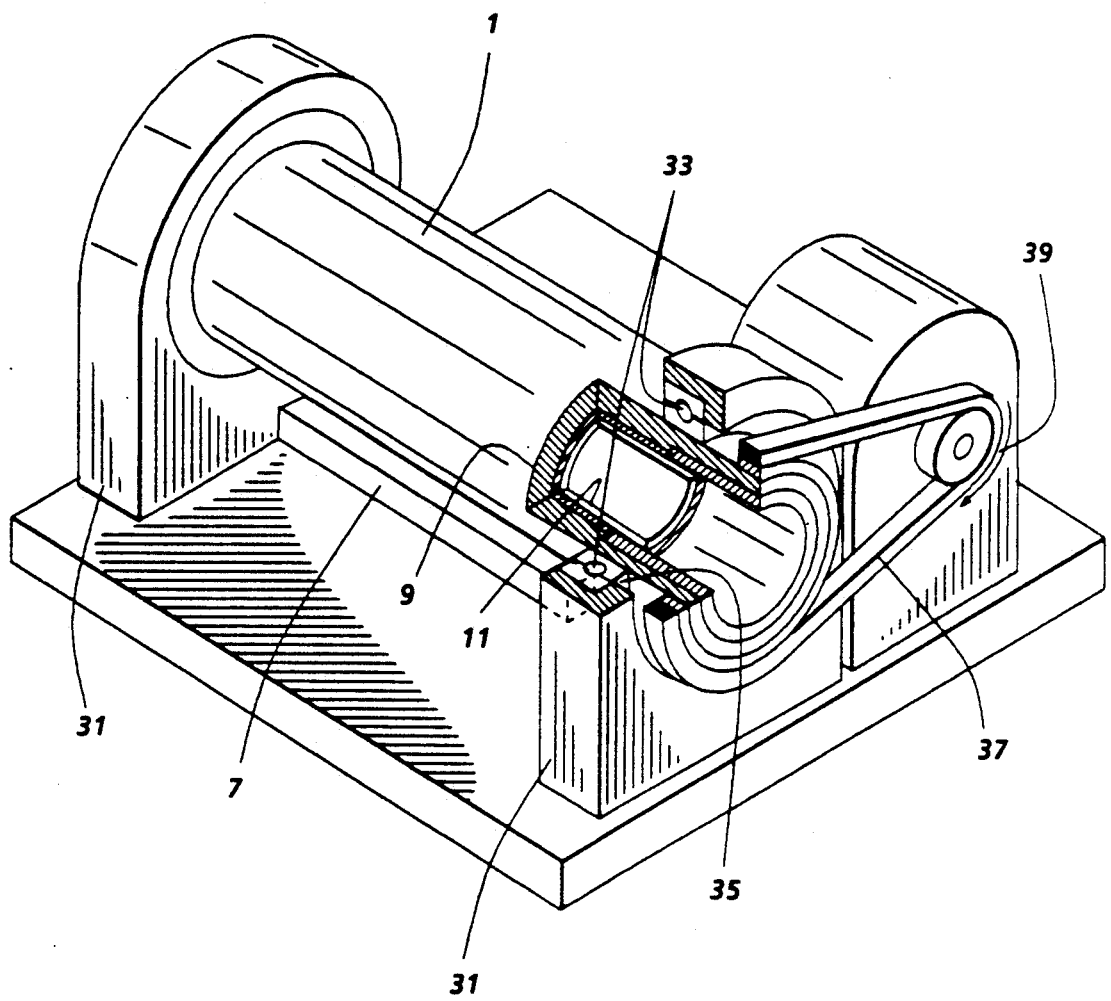

Illustrated schematically in FIGS. 1, 2, and 3 are examples of apparatuses suitable for an embodiment of the present invention wherein a field is applied from outside the mold. As shown in cross section, mold 1 is situated to rotate about axis A. Rotation can be accomplished by any suitable means, such as by placing an end cap on one end of the mold, fitting a shaft to the end cap, and rotating the shaft by any suitable means, such as a motor. Preferably, mold 1 is constructed to prevent the liquid mixture introduced into the mold from flowing out of the open ends. Mold 1 is of any suitable material, and preferably of a nonmagnetic material; while not required, in the embodiment depicted, mold 1 as depicted in FIG. 1 is of a material at least partially transmissive to ultraviolet light, such as glass or quartz. A mixture of a curable liquid and a magnetically attractable material is introduced into mold 1 while the mold is spun about axis A. At east one high intensity magnet 7, such as an electromagnet or a permanent magnet, is situated near the outer diameter of mold 1. Uniformity of the field and of the resulting layer can be improved by scanning the magnet back and forth along the length of the mold to provide a uniform magnetic field. Depending on the strength of the magnet, the distance between the magnet and the mold can be of any desired distance. To minimize the waste of energy, however, the distance between the magnet and the mold preferably is minimized; typical distances are from about 0.002 to about 0.1 inch, although the distance can be outside of this range. As shown in FIG. 1, the mixture of curable liquid and magnetically attractable liquid has separated into two layers as a result of the influence of the magnetic field generated by magnet 7. The outer layer 9 contains the magnetically attractable material and the inner layer 11 is primarily made up of the curable liquid. When the desired degree of separation has been achieved, the curable liquid is cured by heat, radiation, application of a catalyst, or the like. As shown in FIG. 1, curing is by application of ultraviolet radiation from ultraviolet sources 13a and 13b. Only one source of ultraviolet light is necessary when the liquid is cured by ultraviolet radiation, and when the mold is opaque to ultraviolet radiation, one or more radiation sources are situated inside of the mold, as shown with source 13a. Since, in this embodiment, mold 1 is at least partially transmissive to ultraviolet light, it is possible to have one or more radiation sources situated outside of the mold, as shown with source 13b, or to have sources of radiation situated both inside of the mold and outside of the mold, as depicted in the drawing. Typically, the mold is spun during the curing process, and the multilayered cylindrical article thus formed is then removed from the mold.

FIG. 2 illustrates schematically another suitable apparatus for rotating the mold. As illustrated, mold 1 is rotated about axis A by placing on each end of mold 1 circular end caps 21 having perforations 23 situated in their centers. Into perforations 23 are then inserted pivots 25 and 26 mounted on sliding supports 27. Pivot 25 is passive and spins as mold 1 and the end caps are rotated. Pivot 26 has a surface suitable for positive mating with perforation 23 on the end cap, such as a slot-in-groove arrangement, a Phillips screwdriver arrangement, or any other suitable mating. Pivot 26 is caused to spin by any suitable means, such as a motor (not shown), and when mold 1 is mounted on the apparatus by means of end caps 21 and pivots 25, the mold rotates. Sliding supports 27 slide along stationary support 29 in a direction parallel to axis A to allow mounting of the capped mold on the pivots; subsequent to mounting, sliding supports 27 are locked into position. In the embodiment shown, the magnetic field is applied by magnet 7 situated outside mold 1. This rotation apparatus is also suitable for other embodiments of the present invention wherein the magnet is situated inside the mold.

FIG. 3 illustrates schematically yet another suitable apparatus for rotating the mold. As illustrated, mold 1 is mounted on supports 31 having high speed ultra precision bearings 33 situated in bearing housing 35 so that bearings 33 contact the surface of mold 1. The mold is then rotated by belt 37 which contacts the surface of mold 1 and is driven by motor 39. In the embodiment shown, the magnetic field is applied by magnet 7 situated outside mold 1. This rotation apparatus is also suitable for other embodiments of the present invention wherein the magnet is situated inside the mold. As a result of the magnetic field applied to the material in the mold, the mixture initially introduced into mold 1 comprising a curable liquid and a magnetically attractable material has separated into outer layer 9, primarily comprising the magnetically attractable material, and inner layer 11, primarily comprising the curable liquid.

Figure 4A:
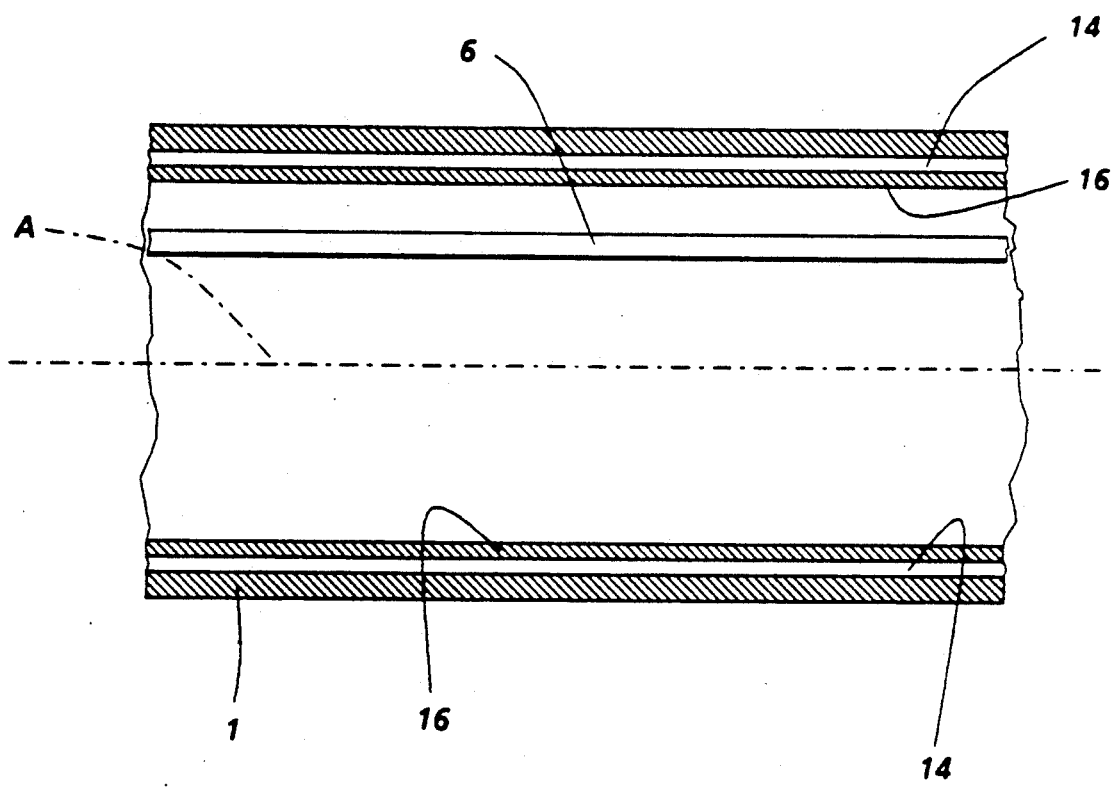
FIG. 4A illustrates schematically another apparatus suitable for some embodiments of the present invention, wherein a field is applied to the inside diameter of a mold.
Figure 4B:
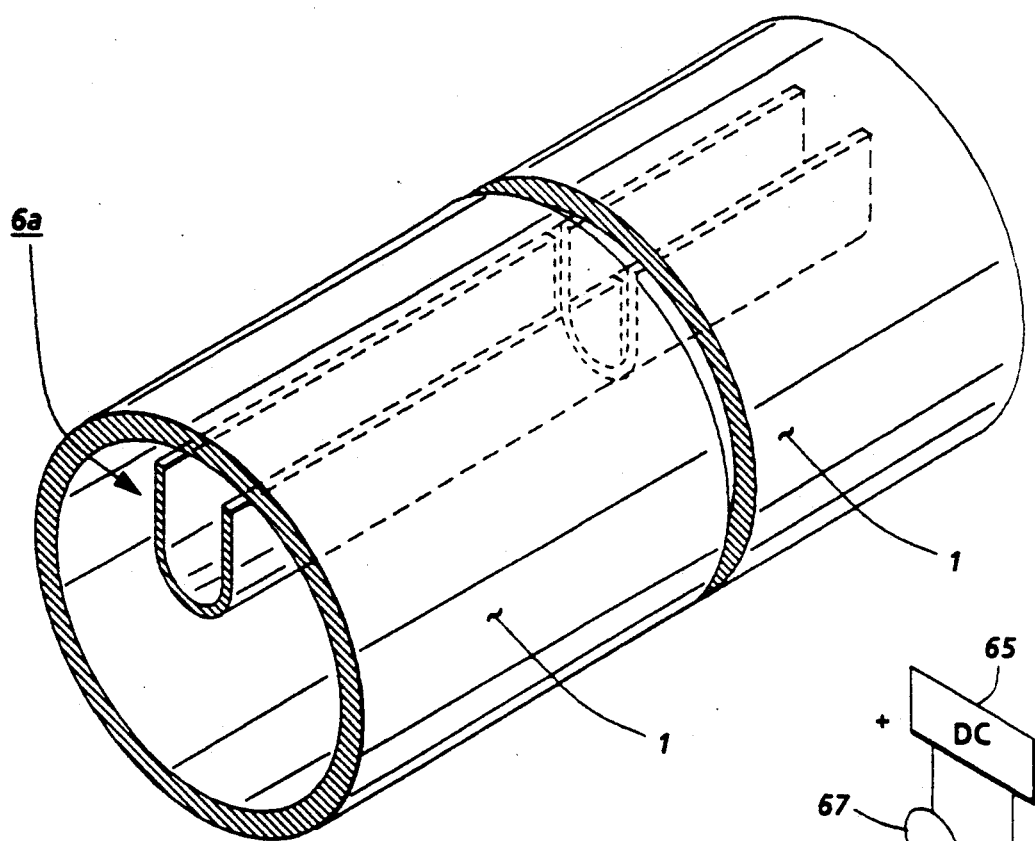
FIGS. 4B, 4C, and 4D illustrate schematically various magnet configurations suitable for embodiments of the present invention employing a magnetic field.
Figure 4C:
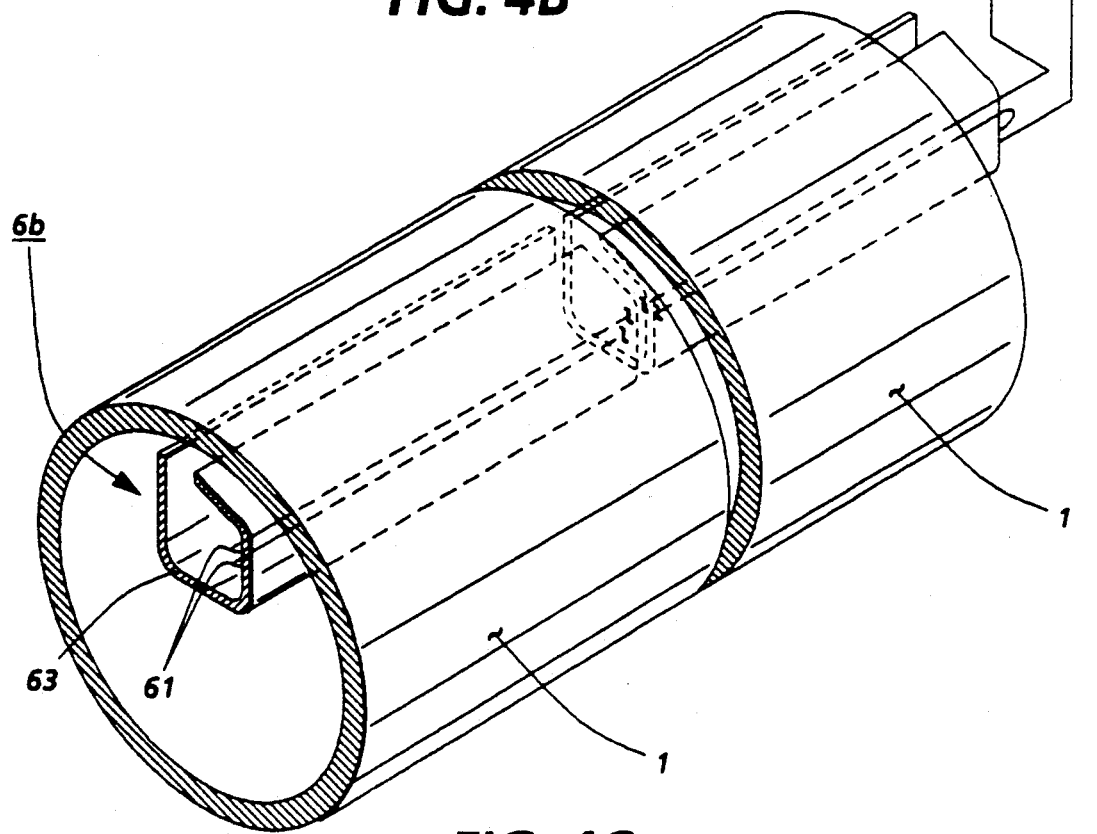
Figure 4D:
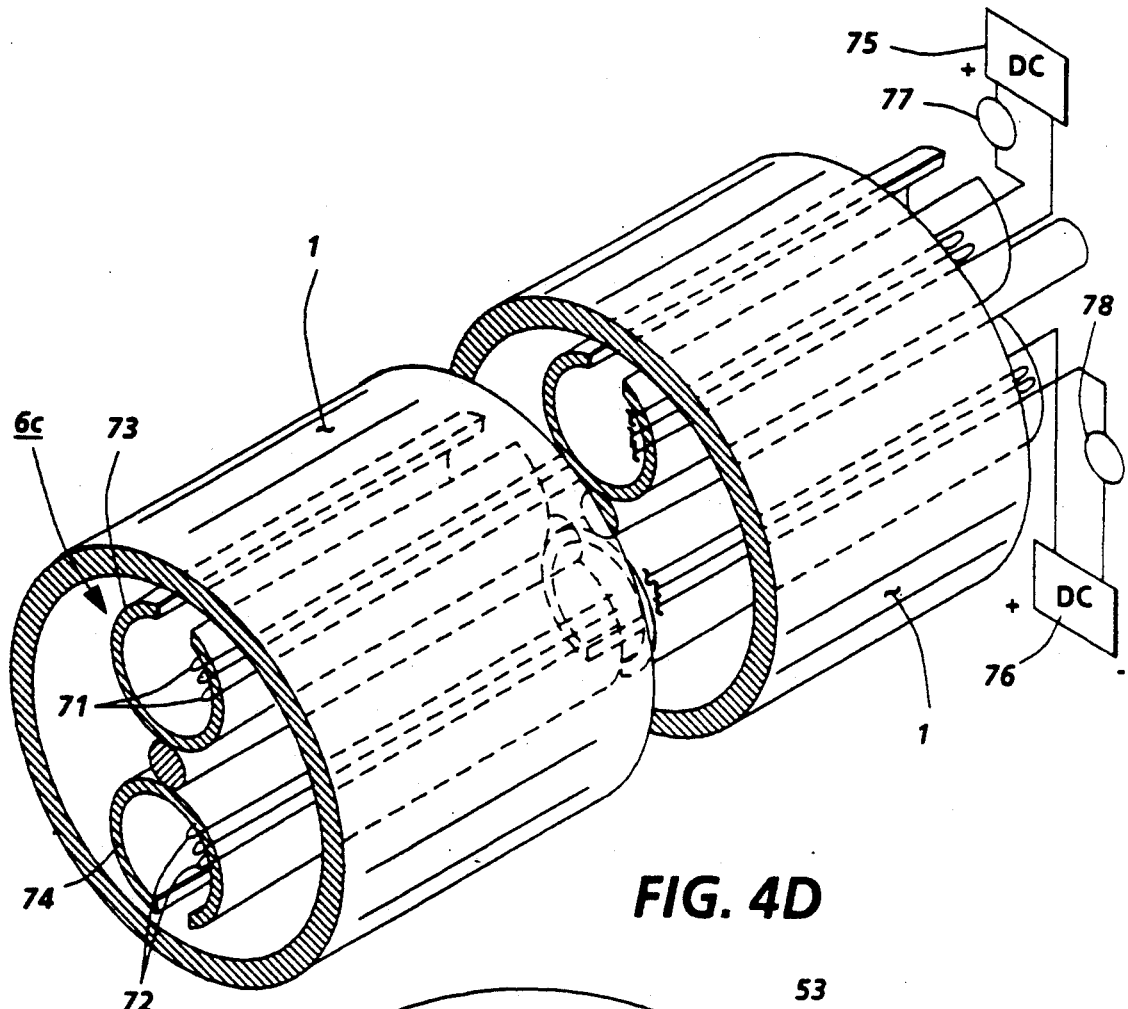

Illustrated schematically in FIG. 4A is an example of an apparatus suitable for an embodiment of the present invention wherein a field is applied from inside the mold to the inside diameter of the composition within the mold. As shown in cross section, mold 1 rotates about axis A. Mold 1 is of any suitable material, and preferably of a nonmagnetic material. Preferably, mold 1 is constructed to prevent the liquid mixture introduced into the mold from flowing out of the open ends. A mixture of a curable liquid and a magnetically attractable material is introduced into mold 1 while the mold is spun about axis A. At least one high intensity magnet 6 is situated near the inside surface of mold 1. The distance between the magnet and the mold can be as desired, depending on the strength of the magnet. To minimize the waste of energy, however, the distance between the magnet and the mold preferably is minimized; typical distances are from about 0.002 to about 0.1 inch, although the distance can be outside of this range. The magnet can be any suitable magnet and one or more magnets can be used. For example, as depicted in FIG. 4B, magnet 6a is a samarium-cobalt segmented bar magnet situated inside the mold. Alternatively, as shown in FIG. 4C, magnet 6b is an electromagnet situated inside the mold and having wires 61 wound around pole 63 and connected to a DC power source 65, with an amp gauge 67 connected in series. The strength of the magnetic field generated by the electromagnet is a function of the number of windings, the current (amperes), and the distance from the pole. Further, as shown in FIG. 4D, more than 1 magnet can be employed. In FIG. 4D, ferromagnetic-electromagnetic assembly 6c comprises wires 71 and 72 wound around poles 73 and 74, respectively, and connected to DC power sources 75 and 76 with amp gauges 77 and 78 connected in series. Ferromagentic-electromagnetic assemblies are preferred, since it is possible to alter the magnetic field strength easily by changing the DC current.

As shown in FIG. 4A, the mixture of curable liquid and magnetically attractable liquid has separated into two layers as a result of the influence of the magnetic field generated by magnet 6. The outer layer 14 is primarily made up of the curable liquid and the inner layer 16 contains the magnetically attractable material. When the desired degree of separation has been achieved, the curable liquid is cured by heat, radiation, application of a catalyst, or the like. Typically, the mold is spun during the curing process, and the multilayered cylinder thus formed is then removed from the mold.

The applied magnetic field is of any magnitude effective to result in the desired degree of separation, and generally is from about 0.5 to about 1.95 Weber per square meter, preferably from about 1.0 to about 1.95 Weber per square meter, although the field magnitude can be outside of this range. The magnetic field can be generated by placing one or more magnets near the inside or outside diameter of the mold, or, if desired, by incorporating the magnet or magnets into the mold wall itself. Typical rotation speeds are from about 100 to about 5,000 revolutions per minute, and preferably from about 300 to about 2,000 revolutions per minute, although the rotation speed can be outside of this range. The filler particles can be of any suitable size and shape, and typically have a particle size of from about 0.1 to about 5,000 microns, and preferably from about 10 to about 100 microns, although the particle size can be outside of this range.

The mold employed for the processes of the present invention can be of any suitable material, such as glass, plastics or other polymeric materials, nonmagnetic metals, nonmagnetic ceramics, or the like. Curing means, such as a hot air gun or an infrared light source, can be placed inside or outside the mold as desired. The mold dimensions are determined by the desired dimensions of the layered article produced by the process.

Prior to performing the process steps of the present invention, the inner surface of the mold can optionally be coated with a mold release agent. Removal of a multilayered cylinder from the mold can present difficulties, particularly when the cylinder comprises a thermoset resin with very low mold shrinkage characteristics. Removal can be facilitated by coating the mold surface with a release agent. In one particularly preferred method, the mold is coated by introducing into the mold a molten release material, such as a wax, and spinning the mold to coat the inner surface centrifugally, followed by solidifying the release material prior to addition of the mixture of materials to be separated into layers. When the multilayered cylinder has been prepared, it is ejected from the mold by remelting the release material. Coating the inner surface of the mold by this process also has advantages in that the inner surface of the solidified release material perfectly defines the axis of rotation of the mold and provides a mold surface which is glass smooth. Thus, the coated mold has an excellent surface finish and very uniform dimensions. Examples of release materials include silicone resins cured with a catalyst, silicone oil, fluorocarbon oils and coatings, waxes, fatty acids and salts, hydrocarbon oils, and the like.

The mixture of materials to be separated into layers can be introduced into the mold by any suitable process, such as with an air operated caulking gun, an extruder, or the like. The mold is spun for any effective period of time during introduction of the material into the mold. A typical time range is from about 5 to about 20 seconds of axial traverse while dispersing, which means that the dispenser is moved along the length of the mold wall to deposit the material uniformly on the mold wall; within about 5 to about 20 seconds, the dispenser has moved along the length of the mold one or more times to dispense the material. Slower or faster dispensing times can also be employed if desired, and slower times will typically be employed when the material is dispensed without the benefit of an automated dispenser. The mold can be maintained at any desired or suitable temperature during introduction of the material, with typical temperatures being from about 20° to about 150° C., and can either be stationary during dispensing (0 revolutions per minute) or maintained at any desired or suitable speed of rotation during introduction of material, with typical speeds being from about 1 to about 5,000 revolutions per minute. The mold can be spun at the same speed during both dispensing and separation of the materials into layers, or if desired the speed can be altered after the material has been deposited on the mold wall. Spinning of the mixture in the mold is continued until the desired degree of separation has resulted; typically, separation of a mixture into layers takes from about 10 seconds to about 10 minutes, although the actual times employed can be outside of this range provided that the objectives of the present invention are achieved. Curing of the separated layers can be by any suitable process. For example, when the liquid component of the mixture is a resin curable to a solid by exposure to ultraviolet light, an ultraviolet lamp situated inside or outside the mold can be employed to expose and cure the layers and thus form the multilayered cylinder. When the lamp is situated outside of the mold, the mold is of a material that is transparent to ultraviolet radiation. Similarly, when the liquid component of the mixture is a resin curable to a solid by heating, a radiant source of heat can be situated inside of the mold to heat the layers, or the mold itself can be heated to effect curing. Curing can also take place at room temperature with the use of suitable initiators and polymerization promoters; for example, an unsaturated polyester resin can be cured by the activation of a methyl ethyl ketone peroxide initiator with a cobalt octoate promoter.

Curing can also be effected by magnetic induction heating when the materials are heat curable. Magnetic induction heating can initiate a thermal polymerization reaction in the curable liquid and can also control the temperature during the reaction. If desired, the temperature can be increased during the reaction to accelerate curing. Magnetic induction heating can be implemented by any suitable process. For example, an additional electromagnet can be situated in or near the mold and an oscillating magnetic field can be generated by applying an oscillating current to the electromagnetic coils of the additional magnet. The pole pairs can be situated so that both are inside the mold, both are outside the mold, or one is inside the mold and one is outside the mold. In addition, in embodiments of the present invention employing a magnetic field to effect separation of the mixture into layers, magnetic induction heating can be implemented by generating a relatively large DC magnetic field intensity ($H_{DC}$) with the magnet used to effect separation and superimposing on this field a relatively small high frequency signal ($H_f$) wherein $H_{DC}$ is much larger than $H_f$ and the total field applied ($H = H_{DC} + H_f$) is sufficiently large to result in forced migration of the magnetic material in the mixture in the desired direction. A coil electromagnet can be used wherein the current I in the coil is the sum of a constant current $I_{DC}$ and a superimposed current $I_f$ which has its direction reversed periodically, so that total current $I = I_{DC} + I_f$. The values of $I_{DC}$ and $I_f$ will depend on the number of turns the coil has and on how large a magnetic field is desired.

Figure 5:
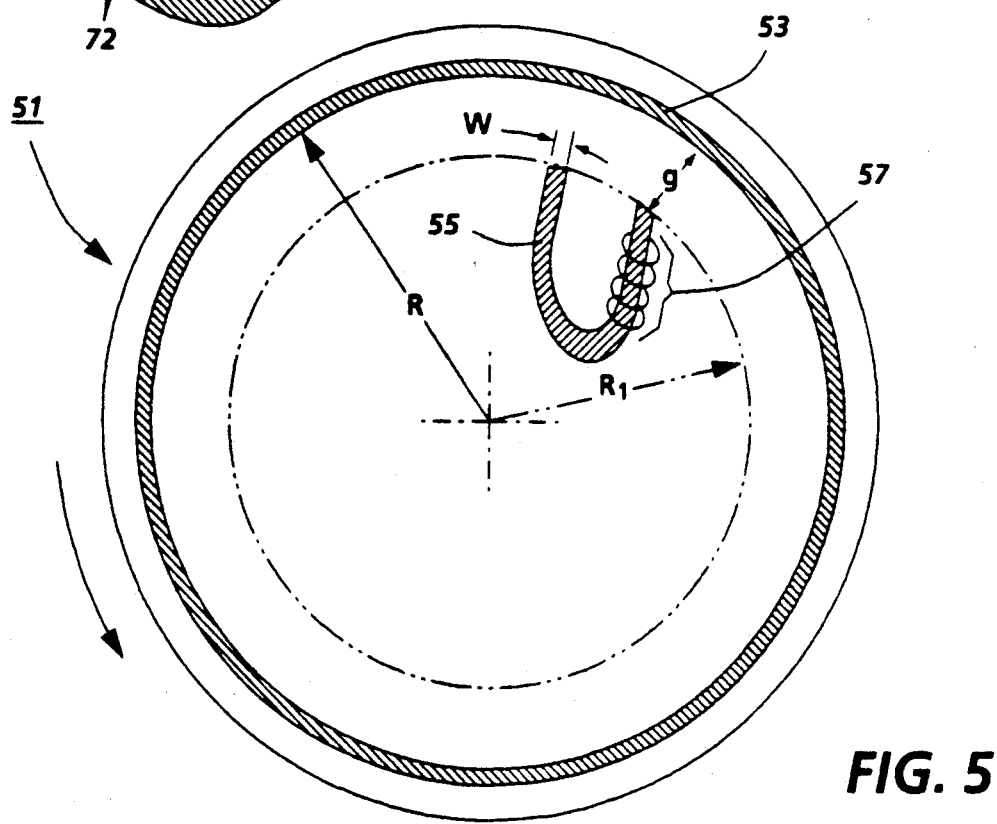
FIG. 5 illustrates schematically one embodiment of the present invention wherein an electromagnet is situated inside of a mold containing a curable liquid resin and magnetic filler particles of a density greater than that of the curable liquid, and a field is applied to direct the magnetic filler particles away from the outside diameter of the mold and to the inside diameter of the two-layer cylinder formed by the illustrated process.

For embodiments of the present invention wherein the magnetically attractable filler particles are of a greater density than the curable liquid resin and the applied magnetic field applied from inside of the mold counteracts centrifugal forces working during spinning of the mold so that the higher density magnetic filler particles are attracted toward the magnet instead of toward the outside diameter of the mold, the particle dynamics encountered can be approximated as follows. As shown schematically in FIG. 5, a cylindrical mold 51 of axial length "L" is coated on its inside diameter with a mixture 53 comprising a curable liquid resin and magnetically attractable filler particles of a density higher than that of the liquid resin. An electromagnet 55 with coils 57 is situated inside the mold at a gap distance "g" from the coating of mixture 53. The dispersed magnetic filler particles are viewed both as discrete particles and as forming a sheet-continuum at radius "R" units from the central axis of rotation of the cylindrical mold. If the pole face, positioned at radius $R_1$, has width "W" and length "l" (length of the magnet, parallel to the axis of rotation of the cylinder), with a gap distance "g" from the sheet-continuum, then, ignoring curvatures, the air gap volume is $2Wlg$ for both poles together. At a magnetic field or magnetic flux density "B", ignoring fringing in the air gap, the total energy in the gap region is "E", wherein $$E = (2Wlg)\frac{1B^2}{2\mu_0}$$

wherein $\mu_0$ is the permeability. Since the air gap energy equals the integral of the force of expansion over distance, the force experienced by the portion of the sheet-continuum under the poles is "$f_m$", where $$f_m = \frac{dE}{dg} = \frac{WlB^2}{\mu_0}$$

If the sheet-continuum has a mass density "m" per unit sheet area, then the portion of the sheet-continuum under the poles experiences a centrifugal force "$f_c$" due to rotational speed "$\omega$", where $$f_c = mR\omega^2(Wl)$$

which, if "R" is large, is a reasonable approximation. Finally, as the particles of the sheet-continuum move, they experience "$F_d$", an aggregate drag force (always retarding), wherein the drag force on each particle is $$F_d = \frac{CA_p\rho u^2}{2} \text{ poundal}$$

wherein
C = drag coefficient ($\approx 0.44$ for spheres in Newton's law region, i.e., Reynold's numbers range of 1,000 to 200,000)
$A_p$ = projected area of particle in direction of motion (square feet)
$\rho$ = density of surrounding fluid (pounds per cubic foot)
u = relative velocity between particle and fluid (feet per second)

This is a standard expression; see, for example, Perry's Chemical Engineering Handbook, 4th ed., John H. Perry, Ed., McGraw Hill, Inc. (1969), the disclosure of which is totally incorporated herein by reference. If the magnetic dispersed filler particle has specific gravity "$\sigma$", then the relevant mass "M", where $$M = mWl$$

has effective volume $$mWl/\sigma$$

and given a mean particle radius "r" constitutes "N" particles, where $$N = \frac{\left(\frac{mWl}{\sigma}\right)}{\left(\frac{4}{3}(\Pi r^3)\right)}$$

This means that the effective "N" particles experience a total force $$f_d = N\left(\frac{C\Pi r^2\rho u^2}{2}\right)$$

$$= \frac{3mWl}{4\Pi\sigma r^3} \times \frac{C\Pi r^2\rho u^2}{2}$$

$$= \frac{3mWlC\rho u^2}{8\sigma r}$$

The differential equations governing the motion of the dispersed particle can now be written as follows. Motion is measured radially outward from the central rotational axis via distance "x". Then during the period of time [0, T] (wherein "0" refers to the distance traveled by the particle away from the axis of rotation and "T" refers to the time at which the particle is not exposed to any magnetic force) when there is no magnetic force, $$(mlW)\frac{d^2x}{dt^2} = (mlW)r\omega^2 - \frac{3mlWC\rho\left(\frac{dx}{dt}\right)^2}{8\sigma r}$$

while during the remainder of the cycle time [P, T] (wherein "P" refers to the time the particle is exposed to the magnetic force) where the magnetic and centrifugal forces both act, noting the direction of retardation having changed once it is imposed that the magnetic force dominates, $$(mlW)\frac{d^2x}{dt^2} = (mlW)R\omega^2 + \frac{3mlWC\rho}{8\sigma r}\left(\frac{dx}{dt}\right)^2 - \frac{WlB^2}{\mu_0}$$

Rather than solve these equations (which are easy to solve but yield complicated expressions), the following approximation is made. The distance and time over which acceleration occurs is negligibly small and substantially everything is dominated by the constant velocity region where $d^2x/dt^2=0$. Using this approximation, two velocities "$V_1$" and "$V_2$" are found as follows:

$$0 = R\omega^2 - \frac{3C\rho}{8\sigma r} V_1^2 \text{ during the time interval } [0,T]$$

and $$0 = R\omega^2 - \frac{3C\rho}{8\sigma r} V_2^2 - \frac{B^2}{m\mu_0} \text{ during the time interval } [0,T]$$

Hence, the net distance travelled by the dispersed particle toward the axis of rotation is "D", where $$D = [-V_1 T + V_2(P - T)] =$$

$$\left[-T\left(\frac{8\sigma rR}{3C\rho}\right)^{\frac{1}{2}}\omega + (P - T)\left(\left(\frac{B^2}{m\mu_0} - R\omega^2\right)\frac{8\sigma r}{3C\rho}\right)^{\frac{1}{2}}\right]$$

To guarantee that $D > 0$, and preferably $D >> 0$, it is imposed that $$(P - T)^2 \left[ \left( \frac{B^2}{m\mu_0} - R\omega^2 \right) \frac{8\sigma r}{3C\rho} \right] >> T^2 \left( \frac{8\sigma r}{3C\rho} \right) \omega^2$$

and this imposition is achieved by making "B" as large as possible and choosing as many magnetic coils as needed, thereby making "T" as small as needed (and hence P-T correspondingly as large as needed). The expression (P-T) represents the time spent beneath the pole faces of one coil unit (or of all magnets if more than one is used). In actual operation, the rotational speed cannot be reduced below a minimum value needed to achieve good surface quality of the finished product, reflecting sufficient press of the outside drum or belt surface against the inner surface of the hollow cylindrical mold. The previous expression simplifies in fact to $$(P - T)^2 \left[ \frac{B^2}{m\mu_0 R\omega^2} - R\omega^2 \right] >> T^2 R\omega^2$$

which is $$\frac{B^2}{m\mu_0 R\omega^2} - 1 >> \left( \frac{T}{P-T} \right)^2$$

Next, when "$R_1$" is large compared to "W", and taking chord length $\approx$ arc length (the following expression can be made exact by using pole faces having circular curvature with arc length equal to "W" rather than chord length), one obtains $$\frac{P}{T} \approx \frac{2\Pi R_1}{2\Pi R_1 - 2W} \text{ at any rotational speed}$$

and thus $$\left( \frac{1}{\frac{P}{T} - 1} \right) \approx \left( \frac{\Pi R_1}{W} - 1 \right)$$

Therefore, the equation $$\frac{B^2}{m\mu_0 R\omega^2} - 1 >> \left( \frac{T}{P-T} \right)^2$$

reduces to $$\frac{B^2}{m\mu_0 R\omega^2} - 1 >> \left( \frac{\Pi R_1}{W} \right)^2$$

As an example of this equation in operation, for an iron-based electromagnet wherein $B \approx 1$ Weber per square meter at a field intensity $H \approx 100$ Amperes per meter and 1.4 Weber per square meter at 200 Amperes per meter in the electromagnet. Thus, in the air gap, $$\frac{B^2}{\mu_0} = \frac{10^7}{4\Pi} \text{ Joules per cubic meter}$$

For the cylindrical mold and for the magnet R=42 millimeters and $R_1$=32 millimeters, and rotational is at 1,000 revolutions per minute; thus, $$\omega = 2\Pi \left( \frac{1,000}{60} \right) \text{rad/sec}$$

The pole width is W=0.012 meters. The particles are iron, and have a bulk packing density which is less than the true mass density of about 7.9 grams per cubic centimeter. The actual bulk packing density is 5.0 grams per cubic centimeter, and a fully compressed layer of the particles measures 0.005 inch thick. Then, $$m \approx 0.05 \times 2.54 \times 5.0 \text{ g/cm}^2 = 0.64 \text{ Kg/m}^2$$

Looking at the inequality equation $$\frac{B^2}{m\mu_0 R\omega^2} - 1 >> \left( \frac{\Pi R_1}{W} \right)^2$$

one obtains
$$L.H.S. = 2.7 \times 10^3$$

while
$$R.H.S. \approx 54$$

wherein L.H.S. refers to the left hand side of the equation and R.H.S. refers to the right hand side of the equation. Using a magnet metal path-length of 3 inches, H=100 A/m can be obtained from a coil of 100 turns employing a current of only 76 milliamps. Even at 3,000 revolutions per minute, L.H.S.>>R.H.S. and the net particle motion is expected to be toward the central axis. At 5,000 revolutions per minute, however, L.H.S.=108 while R.H.S.=54, and therefore the inequality equation is violated, unless more electromagnets are used, or equivalently more than 24 millimeters of magnet pole faces are used at $B \geq 1$ web/m$^2$.

The sheet continuum, however, undergoes magnetic induction heating, even for a fixed magnetic field in the electromagnet, since the sheet continuum sees a B field direction switch from positive to negative as the sheet region moves from over one pole to over the next pole. The energy dissipated, however, is small as a result of the low mass and low rotational frequency. This could be reduced by arranging for the gap to be large at either the positive or negative pole while arranging for the gap to be small at the other pole.

In addition, the sheet continuum region over each pole is driven strongly into saturation if the flux $\Theta = B(WL)$ is entirely concentrated in the thin sheet, as assumed. If not all of $\Theta$ is concentrated in the thin sheet (which is the expected situation), then there is a reduction in the force component tending toward reduction of the air gap, which tends to make the effective $B^2/\mu_0$ of the L.H.S. smaller.

Further, if as desired the sheet continuum is sufficiently compressed to be an electrically conducting "plane", then if both positive and negative poles are nearly equally spaced from the sheet, an induction eddy current will be generated in the continuum. The operation in this mode, however, will be very short lived and its effect will be minimal.

In actual operation of the electromagnetic spin-casting device, caution must be taken to avoid a situation wherein the magnetic force is strong enough to pull the magnetically attractable particles from the curable liquid resin and across the air gap to the pole. To avoid this, the device can be operated as follows: (1) spin the resin plus dispersed particles without any magnetic field applied, thereby creating a finite layer of pure resin at the inside surface of the drum or belt to be created; (2) begin the curing process, ideally first at the inner surface of the drum or belt product; (3) apply the electromagnet to begin particle movement toward the inside surface of the drum or belt product, which creates a pure resin layer at the outside surface of the drum or belt product; (4) design the curing reaction to relate the magnetically induced movement of the particle so that by the time a particle approaches the inner surface of the drum or belt product, the viscosity of the cured resin inhibits particles from reaching the inside surface, or so that an impenetrable thin skin of cured resin is formed at the inside surface of the drum or belt product.

Multilayered cylindrical articles prepared by the process of the present invention are suitable for use as conductive substrates in electrophotographic imaging members. Additional layers may be added to the cylinders to prepare such members. These layers, generally applied to the conductive surface of the cylinder, may comprise a blocking layer, an adhesive layer, a photoconductive layer, a charge transport layer, or a combination of these layers with or without additional layers. One embodiment of the present invention is directed to a process for preparing an electrophotographic imaging member which comprises preparing a cylinder with a conductive layer and an insulating layer by the process of the present invention as detailed herein and coating onto the cylinder a layer of a photogenerating material. The imaging member can then be employed in an imaging process. Another embodiment of the present invention is directed to an imaging process which comprises (1) preparing an imaging member by (a) preparing a cylindrical article comprising a conductive layer and an insulating layer by the process of the present invention as described herein; and (b) coating onto the cylinder a layer of a photogenerating material; (2) forming an electrostatic latent image on the imaging member; (3) developing the latent image; and (4) transferring the developed image to a substrate. Optionally, the transferred image can be permanently affixed to the substrate by any suitable means. Imaging members formed and employed according to the process of the present invention can be photoconductive or photosensitive in nature, wherein the latent image is formed by exposure to a light image, ionographic in nature, wherein the imaging member has a dielectric surface and the image is applied with an ionographic writing head, or by any other suitable imaging process.

Any suitable electrically conductive material can be employed as a conductive layer for imaging members prepared according to the present invention, including copper, brass, nickel, zinc, chromium, stainless steel, conductive plastics and rubbers, aluminum, semitransparent aluminum, steel, cadmium, silver, gold, paper rendered electrically conductive by the inclusion of a suitable material therein or through conditioning in a humid atmosphere to ensure the presence of sufficient water content to render the material conductive, indium, tin, metal oxides, including tin oxide and indium tin oxide, and the like. When the imaging member is to be employed for ionographic imaging processes, it can consist of a conductive layer and a dielectric layer.

When the multilayered cylindrical article is prepared according to the process of the present invention, the electrically conductive layer can be applied by any method suitable for the electrically conductive material and suitable for the desired quality of the applied layer, such as vacuum deposition, electrolytic deposition, solvent coating, or the like. The conductive layer is of an effective thickness, generally from about 5 to about 250 microns, although the thickness can be outside of this range. Similarly, the dielectric layer is of an effective thickness, generally from about 0.1 mil to about 20 mils, although the thickness can be outside of this range. Similarly, the dielectric layer is of an effective thickness, generally from about 1 to about 20 microns, although the thickness can be outside of this range.

Any suitable blocking layer or layers may optionally be applied as one of the imaging member layers of this invention. Typical blocking layers include gelatin (e.g. Gelatin 225, available from Knox Gelatine Inc.), and Carboset 515 (B.F. Goodrich Chemical Company) dissolved in water and methanol, polyvinyl alcohol, polyamides, gamma-aminopropyl triethoxysilane, and the like, used alone or in mixtures and blends. Blocking layers generally range in thickness of from about 0.01 micron to about 2 microns, and preferably have a thickness of from about 0.1 micron to about 1 micron. Thicknesses outside these ranges may be selected provided that the objectives of the present invention are achieved. The blocking layer may be applied with any suitable liquid carrier. Typical liquid carriers include water, methanol, isopropyl alcohol, ketones, esters, hydrocarbons, and the like.

Any suitable adhesive layer may be applied as one of the imaging member layers of this invention. Typical adhesive layers include polyesters such as du Pont 49,000, available from E.I. Du Pont de Nemours & Company, poly(2-vinylpyridine), poly(4-vinylpyridine), and the like. Adhesive layers generally range in thickness of from about 0.05 micron to about 2 microns, and preferably have a thickness of from about 0.1 micron to about 1 micron. Thicknesses outside these ranges may be selected provided that the objectives of the present invention are achieved. The adhesive layer may be applied with a suitable liquid carrier. Typical liquid carriers include methylene chloride, methanol, isopropyl alcohol, ketones, esters, hydrocarbons, and the like.

Any suitable photoconductive layer or layers may be applied as one of the imaging member layers of this invention. The photoconductive layer or layers may contain inorganic or organic photoconductive materials. Typical inorganic photoconductive materials include well known materials such as amorphous selenium, trigonal selenium, selenium alloys, halogen-doped selenium alloys such as selenium-tellurium, selenium-tellurium-arsenic, selenium-arsenic, and the like, cadmium sulfoselenide, cadmium selenide, cadmium sulfide, zinc oxide, titanium dioxide and the like. inorganic photoconductive materials are normally dispersed in a film forming polymer binder. Examples of suitable binders include poly(N-vinylcarbazole), polyvinylbutyral, polystyrene, phenoxy resins, polycarbonate, polyethylene terephthalate, poly N-vinylpyrrolidinone, polyvinyl alcohol, and the like. Typical organic photoconductors include phthalocyanines, quinacridones, pyrazolones, polyvinylcarbazole-2,4,7-trinitrofluorenone, anthracene and the like. Many organic photoconductor materials may also be used as particles dispersed in a resin binder. Typically, the photoconductive material is present in an amount of from about 5 to about 80 percent by weight and the binder is present in an amount of from about 20 to about 95 percent by weight.

Any suitable multilayer photoconductors may also be employed in the imaging member of this invention. The multilayer photoconductors typically comprise at least two electrically operative layers, a photogenerating or charge generating layer and a charge transport layer. The charge generating layer and charge transport layer as well as the other layers may be applied in any suitable order to produce either positive or negative charging photoreceptors. For example, the charge generating layer may be applied prior to the charge transport layer as illustrated in U.S. Pat. No. 4,265,990 or the charge transport layer may be applied prior to the charge generating layer as illustrated in U.S. Pat. No. 4,346,158, the entire disclosures of these patents being incorporated herein by reference.

The photogenerating layer may comprise single or multiple layers comprising inorganic or organic compositions and the like. One example of a generator layer is described in U.S. Pat. No. 3,121,006, the disclosure of which is totally incorporated herein by reference, wherein finely divided particles of a photoconductive inorganic compound are dispersed in an electrically insulating organic resin binder. Useful binder materials disclosed therein include those which are incapable of transporting for any significant distance injected charge carriers generated by the photoconductive particles. Thus, the photoconductive particles must be in substantially contiguous particle to particle contact throughout the layer for the purpose of permitting charge dissipation required for cyclic operation. Thus, about 50 percent by volume of photoconductive particles is usually necessary in order to obtain sufficient photoconductive particle to particle contact for rapid discharge.

Examples of photogenerating layers include trigonal selenium, alloys of selenium with elements such as tellurium, arsenic, and the like, amorphous silicon, various phthalocyanine pigments such as the X-form of metal free phthalocyanine described in U.S. Pat. No. 3,357,989, metal phthalocyanines such as copper phthalocyanine, quinacridones available from DuPont under the tradename Monastral Red, Monastral violet and Monastral Red Y, substituted 2,4-diamino-triazines disclosed in U.S. Pat. No. 3,442,781, polynuclear aromatic quinones, indofast Violet Lake B, Indofast Brilliant Scarlet and Indofast Orange. Examples of photosensitive members having at least two electrically operative layers include the charge generator layer and diamine containing transport layer members disclosed in U.S. Pat. No. 4,265,990, U.S. Pat. No. 4,233,384, U.S. Pat. No. 4,306,008, and U.S. Pat. No. 4,299,897; dyestuff generator layer and oxadiazole, pyrazalone, imidazole, bromopyrene, nitrofluourene and nitronaphthalimide derivative containing charge transport layers members disclosed in U.S. Pat. No. 3,895,944; generator layer and hydrazone containing charge transport layers members disclosed in U.S. Pat. No. 4,150,987; generator layer and a tri-aryl pyrazoline compound containing charge transport layer members disclosed in U.S. Pat. No. 3,837,851; and the like. The disclosures of these patents are incorporated herein in their entirety.

Photogenerating layers containing photoconductive compositions and/or pigments and the resinous binder material generally range in thickness of from about 0.1 micron to about 5.0 microns, and preferably have a thickness of from about 0.3 micron to about 1 micron. Thicknesses outside these ranges may be selected provided the objectives of the present invention are achieved. The photogenerating composition or pigment may be present in the film forming polymer binder compositions in various amounts. For example, from about 10 percent by volume to about 60 percent by volume of the photogenerating pigment may be dispersed in about 40 percent by volume to about 90 percent by volume of the film forming polymer binder composition, and preferably from about 20 percent by volume to about 30 percent by volume of the photogenerating pigment may be dispersed in about 70 percent by volume to about 80 percent by volume of the film forming polymer binder composition. The particle size of the photoconductive compositions and/or pigments should be less than the thickness of the deposited solidified layer and, more preferably between about 0.01 micron and about 0.5 micron to facilitate better coating uniformity.

Any suitable transport layer may be applied as one of the imaging member coatings of this invention to form a multilayered photoconductor. The transport layer may contain a film forming polymer binder and a charge transport material. A preferred multilayered photoconductor comprises a charge generation layer comprising a layer of photoconductive material and a contiguous charge transport layer of a polycarbonate resin material having a molecular weight of from about 20,000 to about 120,000 having dispersed therein from about 25 to about 75 percent by weight of one or more compounds having the general formula:

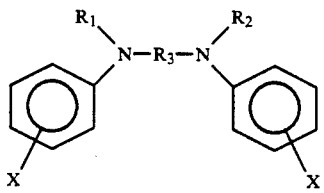

wherein $R_1$ and $R_2$ are an aromatic group selected from the group consisting of a substituted or unsubstituted phenyl group, naphthyl group, and polyphenyl group, $R_3$ is selected from the group consisting of a substituted or unsubstituted biphenyl group, diphenyl ether group, alkyl group having from 1 to 18 carbon atoms, and cycloaliphatic group having from 3 to 12 carbon atoms and X is selected from the group consisting of an alkyl group having from 1 to about 4 carbon atoms and chlorine, the photoconductive layer exhibiting the capability of photogeneration of holes and injection of the holes and the charge transport layer being substantially non-absorbing in the spectral region at which the photoconductive layer generates and injects photogenerated holes but being capable of supporting the injection of photogenerated holes from the photoconductive layer and transporting the holes through the charge transport layer. Examples of charge transporting aromatic amines including those represented by the structural formula above and others for charge transport layers capable of supporting the injection of photogenerated holes of a charge generating layer and transporting the holes through the charge transport layer include N,N'-bis(alkylphenyl)-[1,1'-biphenyl]-4,4'-diamine wherein the alkyl is, for example, methyl, ethyl, propyl, n-butyl, etc., N,N'-diphenyl-N,N'-bis(chlorophenyl)-[1,1'- biphenyl]-4,4'-diamine, N,N'-diphenyl-N,N'-bis(3"-methylphenyl)-(1,1'-biphenyl)-4,4'-diamine, and the like dispersed in an inactive resin binder. Examples of some of these transport materials are described, for example, in U.S. Pat. No. 4,265,990 to Stolka et al., the entire disclosure thereof being incorporated herein by reference. Other examples of charge transport layers capable of supporting the injection of photogenerated holes of a charge generating layer and transporting the holes through the charge transport layer include triphenylmethane, bis(4-diethylamine-2-methylphenyl)-phenylmethane; 4'-4"-bis(diethylamino)-2',2"'-dimethyltriphenyl methane and the like dispersed in an inactive resin binder. Numerous inactive resin materials may be employed in the charge transport layer including those described, for example, in U.S. Pat. No. 3,121,006, the entire disclosure of which is incorporated herein by reference. The resinous binder for the charge transport layer may be identical to the resinous binder material employed in the charge generating layer. Typical organic resinous binders include thermoplastic and thermosetting resins such as polycarbonates, polyesters, polyamides, polyurethanes, polystyrenes, polyarylethers, polyarylsulfones, polybutadienes, polysulfones, polyethersulfones, polyethylenes, polypropylenes, polyimides, polymethylpentenes, polyphenylene sulfides, polyvinyl acetate, polysiloxanes, polyacrylates, polyvinyl acetals, polyamides, polyimides, amino resins, phenylene oxide resins, terephthalic acid resins, epoxy resins, phenolic resins, polystyrene and acrylonitrile copolymers, polyvinylchloride, vinylchloride and vinyl acetate copolymers, acrylate copolymers, alkyd resins, cellulosic film formers, poly(amide-imide), styrenebutadiene copolymers, vinylidenechloride-vinylchloride copolymers, vinylacetate-vinylidenechloride copolymers, styrene-alkyd resins, and the like. These polymers may be block, random, or alternating copolymers.

Generally, the thickness of the solidified transport layer is between about 5 to about 100 microns, but thicknesses outside this range can also be used. The charge transport layer should be an insulator to the extent that the electrostatic charge placed on the charge transport layer is not conducted in the absence of illumination at a rate sufficient to prevent formation and retention of an electrostatic latent image thereon. In general, the ratio of the thickness of the solidified charge transport layer to the charge generator layer is preferably maintained from about 2:1 to 200:1 and in some instances as great as 400:1.

The charge blocking layer generally has a thickness of from about 0.05 to about 5 microns. The charge blocking layer prevents charge injection from the conductive layer into the photogeneration layer and also transfers the discharged electrons into the conductive layer.

Generally, the adhesive layer is situated between the generator layer and the blocking layer, and has a thickness of from about 0.01 to about 2 microns. The adhesive layer may be selected from several known adhesives, such as PE-100, PE200, and 49000 available from Du Pont Chemical Company, or 4-polyvinylpyridine.

If desired, the photoreceptor may also include an overcoating. Any suitable overcoating may be utilized in the fabrication of the photoreceptor of this invention. Typical overcoatings include silicone overcoatings described, for example, in U.S. Pat. No. 4,565,760, polyamide overcoatings such as Elvamide, available from E.I. Du Pont de Nemours & Company, tin oxide particles dispersed in a binder described, for example, in U.S. Pat. No. 4,426,435, metallocene compounds in a binder described, for example, in U.S. Pat. No. 4,315,980, antimony-tin particles in a binder, charge transport molecules in a contiguous binder phase with charge injection particles described in U.S. Pat. No. 4,515,882, polyurethane overcoatings, and the like. The disclosures of U.S. Pat. No. 4,565,760, U.S. Pat. No. 4,426,435, U.S. Pat. No. 4,315,980, and U.S. Pat. No. 4,515,882 are incorporated herein by reference in their entirety. The choice of overcoating materials would depend upon the specific photoreceptor prepared and the protective quality and electrical performance desired. Generally, any overcoatings applied have a thickness between about 0.5 micron and about 10 microns.

Any of the coating materials comprising film forming polymers may be deposited on the imaging member from solutions, dispersions, emulsions or powders by any suitable technique. However, the deposited coating should form a thin substantially uniform fluid coating on the mandrel prior to solidification of the coating. The coating materials can be included in a mixture initially introduced into a mold and subsequently separated into layers during centrifugal casting according to the present invention. A coating material can also be introduced into the mold subsequent to the separation of at least two components of the initial mixture during the casting process; the additional coatings can be introduced into the mold either before, during, or after curing to the initial mixture. In addition, a coating material can be introduced into the mold, spin cast, and cured prior to introduction into the mold of a mixture of materials to be separated according to the present invention. Further, the coating materials can be applied to multilayered cylinders prepared according to the present invention by conventional techniques before or after the cylinder has been removed from the mold. Typical techniques for depositing coatings include spray coating, dip coating, wire wound rod coating, powder coating, electrostatic spraying, sonic spraying, blade coating, and the like. If the coating is applied by spraying, spraying may be effected with or without the aid of a gas. Spraying may be assisted by mechanical and/or electrical aids such as in electrostatic spraying. Materials and process parameters are interdependent in a spray coating operation. Some of the process parameters include propellant gas pressure, solution flow rate, secondary gas nozzle pressure, gun to substrate distance, gun traversal speed and mandrel rotation rate. Materials parameters include, for example, solvent mixtures which affect drying characteristics, the concentration of dissolved solids, the composition of the dissolved solids (e.g. monomer, polymer), and the concentration of dispersed solids when dispersions or solutions are utilized. The deposited coating should be uniform, smooth, and free from blemishes such as entrained gas bubbles and the like. In addition, any of the layers can be deposited on the imaging member by spin casting processes. In this process, the multilayer cylinder formed according to the present invention remains in the mold, and either before or after curing or setting of the material, additional layer materials are introduced into the mold and the mold is spun to deposit the layers uniformly on the inner surface of the multilayer cylinder. The additional layers are then cured according to whatever process is appropriate for the material, such as heat, light exposure, application of a catalyst, or the like.

Electrophotographic imaging members prepared according to the present invention comprise a conductive substrate layer and a photoconductive layer. Any one or more of the other layers described herein can also be present in the imaging member. In addition, multilayered cylindrical articles prepared according to the process of the present invention can be employed as ionographic electroreceptors. Ionographic processes are described, for example, in U.S. Pat. No. 3,564,556, U.S. Pat. No. 3,611,419, U.S. Pat. No. 4,619,515, U.S. Pat. No. 4,240,084, U.S. Pat. No. 4,569,584, U.S. Pat. No. 4,463,363, U.S. Pat. No. 2,919,171, U.S. Pat. No. 4,524,371, U.S. Pat. No. 4,254,424, U.S. Pat. No. 4,538,163, U.S. Pat. No. 4,409,604, U.S. Pat. No. 4,408,214, U.S. Pat. No. 4,365,549, U.S. Pat. No. 4,267,556, U.S. Pat. No. 4,160,257, and U.S. Pat. No. 4,155,093, the disclosures of each of which are totally incorporated herein by reference. An ionographic electroreceptor generally comprises at least a conductive layer and a dielectric layer. Ionographic electroreceptors can be prepared according to the present invention by, for example, forming a multilayered cylinder having a conductive inner layer and a dielectric or insulating outer layer.

The electroreceptor thus prepared can be employed in an ionographic imaging process. Another embodiment of the present invention is directed to an imaging process which comprises (1) preparing an imaging member having a conductive layer and an insulating layer by the process of the present invention; (2) forming an electrostatic latent image on the imaging member by ion deposition; (3) developing the latent image; and (4) transferring the developed image to a substrate. Optionally, the transferred image can be permanently affixed to the substrate by any suitable means.

Any suitable dry or liquid developer containing electrostatically attractable marking particles can be employed to develop the latent image in the electrophotographic and ionographic imaging processes of the present invention. Typical dry toners have a particle size of between about 6 microns and about 20 microns. Typical liquid toners have a particle size of between about 0.1 micron and about 3 microns. The size of toner particles generally affects the resolution of prints. For applications demanding very high resolution, liquid toners are generally preferred because their much smaller toner particle size gives better resolution of fine half-tone dots and produce four color images without undue thickness in dense black areas. Conventional development techniques can be utilized to deposit the toner particles on the imaging surface of the imaging member.

Two-component developers generally comprise toner particles and carrier particles. Typical toner particles can be of any composition suitable for development of electrostatic latent images, such as those comprising a resin and a colorant. Typical toner resins include polyesters, polyamides, epoxies, polyurethanes, diolefins, vinyl resins and polymeric esterification products of a dicarboxylic acid and a diol comprising a diphenol. Examples of vinyl monomers include styrene, p-chlorostyrene, vinyl naphthalene, unsaturated monoolefins such as ethylene, propylene, butylene, isobutylene and the like; vinyl halides such as vinyl chloride, vinyl bromide, vinyl fluoride, vinyl acetate, vinyl propionate, vinyl benzoate, and vinyl butyrate; vinyl esters such as esters of monocarboxylic acids, including methyl acrylate, ethyl acrylate, n-butylacrylate, isobutyl acrylate, dodecyl acrylate, n-octyl acrylate, 2-chloroethyl acrylate, phenyl acrylate, methylalpha-chloroacrylate, methyl methacrylate, ethyl methacrylate, butyl methacrylate, and the like; acrylonitrile, methacrylonitrile, acrylamide, vinyl ethers, including vinyl methyl ether, vinyl isobutyl ether, and vinyl ethyl ether; vinyl ketones such as vinyl methyl ketone, vinyl hexyl ketone, and methyl isopropenyl ketone; N-vinyl endole and N-vinyl pyrrolidene; styrene butadienes; mixtures of these monomers; and the like. The resins are generally present in an amount of from about 30 to about 99 percent by weight of the toner composition, although they can be present in greater or lesser amounts.

Any suitable pigments or dyes or mixture thereof can be employed in the toner particles. Typical pigments or dyes include carbon black, nigrosine dye, aniline blue, magnetites, and mixtures thereof, with carbon black being a preferred colorant. The pigment is preferably present in an amount sufficient to render the toner composition highly colored to permit the formation of a clearly visible image on a recording member. Generally, the pigment particles are present in amounts of from about 1 percent by weight to about 20 percent by weight based on the total weight of the toner composition; however, lesser or greater amounts of pigment particles can be present.

Other colored toner pigments include red, green, blue, brown, magenta, cyan, and yellow particles, as well as mixtures thereof. Illustrative examples of suitable magenta pigments include 2,9-dimethyl-substituted quinacridone and anthraquinone dye, identified in the Color Index as CI 60710, CI Dispersed Red 15, a diazo dye identified in the Color Index as CI 26050, CI Solvent Red 19, and the like. Illustrative examples of suitable cyan pigments include copper tetra-4-(octadecyl sulfonamide) phthalocyanine, X-copper phthalocyanine pigment, listed in the Color Index as CI 74160, CI Pigment Blue, and Anthradanthrene Blue, identified in the Color Index as CI 69810, Special Blue X-2137, and the like. Illustrative examples of yellow pigments that can be selected include diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4′-chloro-2,5-dimethoxy aceto-acetanilide, Permanent Yellow FGL, and the like. These color pigments are generally present in an amount of from about 15 weight percent to about 20.5 weight percent based on the weight of the toner resin particles, although lesser or greater amounts can be present.

When the pigment particles are magnetites, which comprise a mixture of iron oxides ($Fe_3O_4$) such as those commercially available as Mapico Black, these pigments are present in the toner composition in an amount of from about 10 percent by weight to about 70 percent by weight, and preferably in an amount of from about 20 percent by weight to about 50 percent by weight, although they can be present in greater or lesser amounts.

The toner compositions can be prepared by any suitable method. For example, the components of the dry toner particles can be mixed in a ball mill, to which steel beads for agitation are added in an amount of approximately five times the weight of the toner. The ball mill can be operated at about 120 feet per minute for about 30 minutes, after which time the steel beads are removed. Dry toner particles for two-component developers generally have an average particle size between about 6 micrometers and about 20 micrometers.

Any suitable external additives can also be utilized with the dry toner particles. The amounts of external additives are measured in terms of percentage by weight of the toner composition, but are not themselves included when calculating the percentage composition of the toner. For example, a toner composition containing a resin, a pigment, and an external additive can comprise 80 percent by weight of resin and 20 percent by weight of pigment; the amount of external additive present is reported in terms of its percent by weight of the combined resin and pigment. External additives can include any additives suitable for use in electrostatographic toners, including straight silica, colloidal silica (e.g. Aerosil R972 ®, available from Degussa, Inc.), ferric oxide, unilin, polypropylene waxes, polymethylmethacrylate, zinc stearate, chromium oxide, aluminum oxide, stearic acid, polyvinylidene flouride (e.g. Kynar ®, available from Pennwalt Chemicals Corporation), and the like. External additives can be present in any suitable amount, provided that the objectives of the present invention are achieved.

Any suitable carrier particles can be employed with the toner particles. Typical carrier particles include granular zircon, steel, nickel, iron ferrites, and the like. Other typical carrier particles include nickel berry carriers as disclosed in U.S. Pat. No. 3,847,604, the entire disclosure of which is incorporated herein by reference. These carriers comprise nodular carrier beads of nickel characterized by surfaces of reoccurring recesses and protrusions that provide the particles with a relatively large external area. The diameters of the carrier particles can vary, but are generally from about 50 microns to about 1,000 microns, thus allowing the particles to possess sufficient density and inertia to avoid adherence to the electrostatic images during the development process. Carrier particles can possess coated surfaces. Typical coating materials include polymers and terpolymers, including, for example, fluoropolymers such as polyvinylidene fluorides as disclosed in U.S. Pat. No. 3,526,533, U.S. Pat. No. 3,849,186, and U.S. Pat. No. 3,942,979, the disclosures of each of which are totally incorporated herein by reference. The toner may be present, for example, in the two-component developer in an amount equal to about 1 to about 5 percent by weight of the carrier, and preferably is equal to about 3 percent by weight of the carrier.

Typical dry toners are disclosed, for example, in U.S. Pat. No. 2,788,288, U.S. Pat. No. 3,079,342 and U.S. Pat. No. Re. 25,136, the disclosures of each of which are totally incorporated herein by reference. If desired, development can be effected with liquid developers. Liquid developers are disclosed, for example, in U.S. Pat. No. 2,890,174 and U.S. Pat. No. 2,899,335, the disclosures of each of which are totally incorporated herein by reference. Liquid developers can comprise aqueous based or oil based inks, and include both inks containing a water or oil soluble dye substance and pigmented inks. Typical dye substances are Methylene Blue, commercially available from Eastman Kodak Company, Brilliant Yellow, commercially available from the Harlaco Chemical Company, potassium permanganate, ferric chloride and Methylene Violet, Rose Bengal and Quinoline Yellow, the latter three available from Allied Chemical Company, and the like. Typical pigments are carbon black, graphite, lamp black, bone black, charcoal, titanium dioxide, white lead, zinc oxide, zinc sulfide, iron oxide, chromium oxide, lead chromate, zinc chromate, cadmium yellow, cadmium red, red lead, antimony dioxide, magnesium silicate, calcium carbonate, calcium silicate, phthalocyanines, benzidines, naphthols, toluidines, and the like. The liquid developer composition can comprise a finely divided opaque powder, a high resistance liquid, and an ingredient to prevent agglomeration. Typical high resistance liquids include such organic dielectric liquids as paraffinic hydrocarbons such as the Isopar ® and Norpar ® family, carbon tetrachloride, kerosene, benzene, trichloroethylene, and the like. Other liquid developer components or additives include vinyl resins, such as carboxy vinyl polymers, polyvinylpyrrolidones, methylvinylether maleic anhydride interpolymers, polyvinyl alcohols, cellulosics such as sodium carboxy-ethylcellulose, hydroxypropylmethyl cellulose, hydroxyethyl cellulose, methyl cellulose, cellulose derivatives such as esters and ethers thereof, alkali soluble proteins, casein, gelatin, and acrylate salts such as ammonium polyacrylate, sodium polyacrylate, and the like.

Any suitable development technique can be utilized to deposit toner particles on the electrostatic latent image on the imaging member surface. Well known development techniques include magnetic brush development, cascade development, powder cloud development, electrophoretic development, and the like. Magnetic brush development is more fully described, for example, in U.S. Pat. No. 2,791,949, the disclosure of which is totally incorporated herein by reference, cascade development is more fully described, for example, in U.S. Pat. No. 2,618,551 and U.S. Pat. No. 2,618,552, the disclosures of each of which are totally incorporated herein by reference, powder cloud development is more fully described, for example, in U.S. Pat. No. 2,725,305, U.S. Pat. No. 2,918,910, and U.S. Pat. No. 3,015,305, the disclosures of each of which are totally incorporated herein by reference, and liquid development is more fully described, for example, in U.S. Pat. No. 3,084,043, the disclosure of which is totally incorporated herein by reference.

The deposited toner image is subsequently transferred to a substrate, such as paper, transparency material, or the like. Transfer can be enhanced by applying an electrostatic charge to the rear surface of the substrate by a charging means such as a corona device. The deposited toner image can be transferred to a substrate such as paper or transparency material by any suitable technique, such as corona transfer, pressure transfer, adhesive transfer, bias roll transfer, and the like. Typical corona transfer entails contacting the deposited toner particles with a sheet of paper and applying an electrostatic charge on the side of the sheet opposite to the toner particles. A single wire corotron having applied thereto a potential of between about 5000 and about 8000 volts provides satisfactory transfer. After transfer, the transferred toner image can be fixed to the receiving sheet. Typical well known fusing techniques include heated roll fusing, flash fusing, oven fusing, cold pressure fusing, laminating, adhesive spray fixing, and the like.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

A mold consisting of a cylindrical tube of pure quartz 4.5 inches in inside diameter, 13.25 inches long, and 0.25 inch in wall thickness is obtained from a glass supplier. The mold is mounted in a LeBlonde metal working lathe by two end caps with protruding center shafts. The end caps are fabricated from aluminum and are fitted with O ring seals to prevent leakage of the fluid. The end caps are also provided with holes near the center so that the fluid/particulate mixture can be injected into the mold. Prior to injection of the fluid/particulate mixture, the inside diameter of the mold is coated with a mold release agent (Frekote 33H, available from Frekote Corporation, 140 North Federal Highway, Boca Raton, Fla., 33432).

Into 100 milliliters of Desolite 3380-78 (a urethane acrylate polymer, available from DeSoto Chemical Company (DSM Desotech Corporation)) is dispersed 17 grams of nickel powder (15 micron average particle size, #N1023, available from CERAC Corporation). Subsequently, 90 milliliters of the resulting dispersion is injected into the cylindrical mold. The mold is then rotated slowly until the dispersion becomes evenly distributed across the length of the mold. Thereafter, the rotational speed is increased to 1,800 revolutions per minute for about 2 minutes until the dispersion becomes evenly distributed around and across the inside of the mold. A magnetic field is then applied from the exterior of the mold for a period of 5 minutes, until most of the nickel particles are drawn outward toward the wall of the quartz mold. The magnetic field is produced by a 14 inch long segmented (2 inch segments) samarium-cobalt permanent magnet, which is oscillated back and forth over a distance of 1 inch in a direction parallel to the axis of rotation and at a distance of $\frac{1}{8}$ inch from the outside diameter of the mold. Oscillation of the magnet results in a more uniform magnetic field and accordingly results in a more uniform layer of the particulate matter in the dispersion. Curing of the dispersion is then accomplished by a high intensity ultraviolet light source (Model Super Six, available from Fusion UV Curing Systems, Inc.). The ultraviolet source is placed at a distance of 2 inches from the outside diameter of the rotating quartz mold and irradiation occurs over a period of 2 minutes. Since the curing lamp is only 6 inches long, it cannot cover the entire length of the mold, and it is therefore scanned back and forth at a rate of 1 inch per second to cover the entire length of the mold. The light intensity is 200 watts per inch with a Model SD-131 bulb.

The cylindrical article thus produced is removed from the mold by inserting a thin stainless steel blade between the mold and the article at the edge and then peeling the flexible cylindrical article from the mold. The article thus produced is, for example, suitable for use as a conductive substrate which can be coated with a photogenerating layer to form an imaging member.

EXAMPLE II

A mold consisting of a cylindrical tube of pure quartz 4.5 inches in inside diameter, 13.25 inches long, and 0.25 inch in wall thickness is mounted in a LeBlonde metal working lathe by two end caps with protruding center shafts. The end caps are fabricated from aluminum and fitted with O ring seals to prevent leakage of the fluid. The end caps are also provided with large holes near the center (with the end caps providing a ridge extending only about $\frac{1}{8}$ inch toward the inside of the mold to retain the fluid inside the mold, so that a fluid/particulate mixture can be injected into the mold. A magnet is situated inside the mold by mounting it in a cantilevered position so that it extends through the holes in the end caps. Prior to injection of the fluid/particulate mixture, the inside diameter of the mold is coated with a mold release agent (Frekote 33H, available from Frekote Corporation, 140 North Federal Highway, Boca Raton, Fla., 33432).

Into 100 milliliters of Desolite 3380-78 (a urethane acrylate polymer, available from DeSoto Chemical Company (DSM Desotech Corporation)) is dispersed 17 grams of nickel powder (15 micron average particle size, #N1023, available from CERAC Corporation). Subsequently, 90 milliliters of the resulting dispersion is injected into the cylindrical mold. The mold is then rotated slowly until the dispersion is evenly distributed across the length of the mold. Thereafter, the rotational speed is increased to 1,800 revolutions per minute for about 2 minutes until the dispersion is evenly distributed around and across the inside of the mold. A magnetic field is then applied from the interior of the mold for a period of 5 minutes, until most of the nickel particles are drawn inward away from the wall of the quartz mold. The magnetic field is produced by a 14 inch long segmented (2 inch segments) samarium-cobalt permanent magnet mounted by cantilever within the mold, which is oscillated back and forth over a distance of 1 inch in a direction parallel to the axis of rotation and at a distance of about $\frac{1}{8}$ inch from the inside diameter of the mold. Oscillation of the magnet results in a more uniform magnetic field and accordingly results in a more uniform layer of the particulate matter in the dispersion. Curing of the dispersion is then accomplished by a high intensity ultraviolet light source (Model Super Six, available from Fusion UV Curing Systems, Inc.). The ultraviolet source is placed at a distance of 2 inches from the outside diameter of the rotating quartz mold and irradiation occurs over a period of 2 minutes. Since the curing lamp is only 6 inches long, it cannot cover the entire length of the mold, and it is therefore scanned back and forth at a rate of 1 inch per second to cover the entire length of the mold. The light intensity is 200 watts per inch with a Model SD-131 bulb.

The cylindrical article thus produced is removed from the mold by inserting a thin stainless steel blade between the mold and the article at the edge and then peeling the flexible cylindrical article from the mold. The article thus produced is, for example, suitable for use as an ionographic dielectric receiver. In addition, the article thus produced can be coated with a photogenerating layer to form a photosensitive imaging member with a blocking layer situated between the conductive layer and the photogenerating layer.

EXAMPLE III

A two-layer cylindrical drum is prepared as follows. To 75 milliliters of Polyrite 33-402 (an unsaturated polyester dissolved in a styrene monomer that acts as a crosslinking agent, available from Reichhold Ltd.) with a density of 1.08 grams per milliliter is added 34.87 grams of silver coated hollow glass spheres with a density of about 0.65 gram per milliliter (Metalite Ag SF-14, available from PQ Corporation), and 1.5 milliliters of methyl ethyl ketone peroxide (Lupersol DDM-9, available from Lucidol Division, Pennwalt Corporation) as a polymerization initiator. The ingredients are mixed and the mixture is deposited by manual pouring into a mold consisting of a cylindrical tube of pure quartz 4.5 inches in inside diameter, 13.25 inches long, and 0.25 inch in wall thickness. The mold is mounted in a LeBlonde metal working lathe by two end caps with protruding center shafts. The end caps are fabricated from aluminum and fitted with O ring seals to prevent leakage of the fluid. The end caps are also provided with holes near the center so that a fluid/particulate mixture can be injected into the mold. The mold is then rotated slowly until the mixture is evenly distributed across the length of the mold. Thereafter, the rotational speed is increased to 1,300 revolutions per minute for about 3 minutes until the dispersion is evenly distributed around and across the inside of the mold. A magnetic field is then applied from the exterior of the mold for a period of 5 minutes, until most of the silver coated hollow glass spheres are drawn outward toward the wall of the quartz mold. The magnetic field is produced by a 14 inch long segmented (2 inch segments) samarium-cobalt permanent magnet, which is oscillated back and forth over a distance of 1 inch in a direction parallel to the axis of rotation and at a distance of ⅛ inch from the outside diameter of the mold. Oscillation of the magnet results in a more uniform magnetic field and accordingly results in a more uniform layer of the particulate matter in the dispersion. The resin in the mixture is then cured at room temperature, resulting in formation of a two-layer cylindrical drum having a conductive outer layer consisting of the silver coated glass spheres in a matrix of the cured polyester resin and an inner layer consisting of the cured polyester resin. Upon curing, the solid cylindrical drum exhibits sufficient shrinkage to enable removal from the mold simply by lifting it out. The article thus produced is, for example, suitable for use as a conductive substrate which can be coated with a photogenerating layer to form an imaging member.

EXAMPLE IV

A two-layer cylindrical drum is prepared as follows. To 225 grams of Polylite 33-402 (an unsaturated polyester dissolved in a styrene monomer that acts as a crosslinking agent, available from Reichhold Ltd.) with a density of 1.08 grams per milliliter is added 6 grams of silver coated glass fibers with a density of about 3.5 grams per milliliter (Ag Clad Filament 32, available from PQ Corporation) and 2 milliliters of methyl ethyl ketone peroxide (Lupersol DDM-9, available from Lucidol Division, Pennwalt Corporation) as a polymerization initiator. The ingredients are mixed and the mixture is deposited by manual pouring into a mold consisting of a cylindrical tube of pure quartz 4.5 inches in inside diameter, 13.25 inches long, and 0.25 inch in wall thickness. The mold is mounted in a LeBlonde metal working lathe by two end caps with protruding center shafts. The end caps are fabricated from aluminum and fitted with O ring seals to prevent leakage of the fluid. The end caps are also provided with holes near the center so that a fluid/particulate mixture can be injected into the mold. The mold is then rotated slowly until the mixture is evenly distributed across the length of the mold. Thereafter, the rotational speed is increased to 2,300 revolutions per minute for about 1.5 minutes until the dispersion is evenly distributed around and across the inside of the mold. A magnetic field is then applied from the exterior of the mold for a period of 5 minutes, until most of the silver coated glass fibers are drawn outward toward the wall of the quartz mold. The magnetic field is produced by a 14 inch long segmented (2 inch segments) samarium-cobalt permanent magnet, which is oscillated back and forth over a distance of 1 inch in a direction parallel to the axis of rotation and at a distance of ⅛ inch from the outside diameter of the mold. Oscillation of the magnet results in a more uniform magnetic field and accordingly results in a more uniform layer of the particulate matter in the dispersion. The resin in the mixture is then cured at room temperature, resulting in formation of a two-layer cylindrical drum having a conductive surface coating comprising the silver coated glass fibers dispersed in the resin and a dielectric resin inner layer. Upon curing, the solid cylindrical drum exhibited sufficient shrinkage to enable removal from the mold simply by lifting it out. The article thus produced is, for example, suitable for use as a conductive substrate which can be coated with a photogenerating layer to form an imaging member.

EXAMPLE V

A two-layer cylindrical drum is prepared as follows. To 75 milliliters of Polylite 33-402 (an unsaturated polyester dissolved in a styrene monomer that acts as a crosslinking agent, available from Reichhold Ltd.) with a density of 1.08 grams per milliliter is added 34.87 grams of silver coated hollow glass spheres with a density of about 0.65 gram per milliliter (Metarite Ag SF-14, available from PQ Corporation), and 1.5 milliliters of methyl ethyl ketone peroxide (Lupersol DDM-9, available from Lucidol Division, Pennwalt Corporation) as a polymerization initiator. The ingredients are mixed and the mixture is deposited by manual pouring into a mold consisting of a cylindrical tube of pure quartz 4.5 inches in inside diameter, 13.25 inches long, and 0.25 inch in wall thickness. The mold is mounted in a LeBlonde metal working lathe by two end caps with protruding center shafts. The end caps are fabricated from aluminum and fitted with O ring seals to prevent leakage of the fluid. The end caps are also provided with holes near the center (with the end caps providing a ridge extending only about ⅛ inch toward the inside of the mold to retain the fluid inside the mold), so that a fluid/particulate mixture can be injected into the mold. A magnet is situated inside the mold by mounting it in a cantilevered position so that it extends through the holes in the end caps. The mold is then rotated slowly until the mixture is evenly distributed across the length of the mold. Thereafter, the rotational speed is increased to 1,300 revolutions per minute for about 3 minutes until the dispersion is evenly distributed around and across the inside of the mold. A magnetic field is then applied from the interior of the mold for a period of 5 minutes, until most of the silver coated hollow glass spheres are drawn inward away from the wall of the quartz mold. The magnetic field is produced by a 14 inch long segmented (2 inch segments) samarium-cobalt permanent magnet mounted by cantilever within the mold, which is oscillated back and forth over a distance of 1 inch in a direction parallel to the axis of rotation and at a distance of ⅛ inch from the inside diameter of the mold. Oscillation of the magnet results in a more uniform magnetic field and accordingly results in a more uniform layer of the particulate matter in the dispersion. The resin in the mixture is then cured at room temperature, resulting in formation of a two-layer cylindrical drum having a conductive inner layer consisting of the silver coated glass spheres in a matrix of the cured polyester resin and an outer layer consisting of the cured polyester resin. Upon curing, the solid cylindrical drum exhibits sufficient shrinkage to enable removal from the mold simply by lifting it out. The article thus produced is, for example, suitable for use as an ionographic dielectric receiver. In addition, the article thus produced can be coated with a photogenerating layer to form a photosensitive imaging member with a blocking layer situated between the conductive layer and the photogenerating layer.

EXAMPLE VI

A two-layer cylindrical drum is prepared as follows. To 225 grams of Polylite 33-402 (an unsaturated polyester dissolved in a styrene monomer that acts as a crosslinking agent, available from Reichhold Ltd.) with a density of 1.08 grams per milliliter is added 6 grams of silver coated glass fibers with a density of about 3.5 grams per milliliter (Ag Clad Filament 32, available from PQ Corporation) and 2 milliliters of methyl ethyl ketone peroxide (Lupersol DDM-9, available from Lucidol Division, Pennwalt Corporation) as a polymerization initiator. The ingredients are mixed and the mixture is deposited by manual pouring into a mold consisting of a cylindrical tube of pure quartz 4.5 inches in inside diameter, 13.25 inches long, and 0.25 inch in wall thickness. The mold is mounted in a LeBlonde metal working lathe by two end caps with protruding center shafts. The end caps are fabricated from aluminum and fitted with O ring seals to prevent leakage of the fluid. The end caps are also provided with holes near the center (with the end caps providing a ridge extending only about ⅛ inch toward the inside of the mold to retain the fluid inside the mold). A magnet is situated inside the mold by mounting it in a cantilevered position so that it extends through the holes in the end caps. The mold is then rotated slowly until the mixture is evenly distributed across the length of the mold. Thereafter, the rotational speed is increased to 2,300 revolutions per minute for about 1.5 minutes until the dispersion is evenly distributed around and across the inside of the mold. A magnetic field is then applied from the interior of the mold for a period of 5 minutes, until most of the silver coated glass fibers are drawn inward away from the wall of the quartz mold. The magnetic field is produced by a 14 inch long segmented (2 inch segments) samarium-cobalt permanent magnet mounted by cantilever within the mold, which is oscillated back and forth over a distance of 1 inch in a direction parallel to the axis of rotation and at a distance of about ⅛ inch from the inside diameter of the mold. Oscillation of the magnet results in a more uniform magnetic field and accordingly results in a more uniform layer of the particulate matter in the dispersion. The resin in the mixture is then cured at room temperature, resulting in formation of a two-layer cylindrical drum having a conductive inner layer comprising the sliver coated glass fibers dispersed in the resin and a dielectric resin outer layer. Upon curing, the solid cylindrical drum exhibited sufficient shrinkage to enable removal from the mold simply by lifting it out. The article thus produced is, for example, suitable for use as an ionographic dielectric receiver. In addition, the article thus produced can be coated with a photogenerating layer to form a photosensitive imaging member with a blocking layer situated between the conductive layer and the photogenerating layer.

EXAMPLE VII

A two-layer drum prepared as described in Example II is incorporated into an ionographic imaging test fixture and a positively charged latent image is generated on the outer surface with an ionographic writing head. The latent image is developed with a negatively charged magenta liquid developer comprising an Isopar ® G liquid vehicle, magenta toner particles in an amount of 1.5 percent by weight of the developer comprising about 15 percent by weight of Hostaperm Pink E pigment and about 85 percent by weight of poly(2-ethyl hexyl methacrylate) (Polysciences, Inc.), and OLOA 1200 in an amount of about 1 percent by weight of the solids content of the developer. Subsequently, the developed image is transferred to Xerox ® 4024 paper.

The above process is repeated except that a negatively charged latent image is generated on the outer layer of the drum with the ionographic writing head and the latent image is developed with a two-component developer comprising 2.5 percent by weight of a positively charged black toner prepared by mixing together 92 parts by weight of a styrene-n-butylmethacrylate resin, 6 parts by weight of Regal 330 ® carbon black from Cabot Corporation, and 2 parts by weight of cetyl pyridinium chloride and melt blending in an extruder, followed by micronization and air classification to obtain toner particles with an average diameter of 12 microns, and 97.5 percent by weight of a carrier prepared by solution coating a Hoeganoes Anchor Steel core with a particle diameter range of from about 75 to about 150 microns, available from Hoeganoes Company, with 0.4 parts by weight of a coating comprising 20 parts by weight of Vulcan carbon black, available from Cabot Corporation, homogeneously dispersed in 80 parts by weight of a chlorotrifluoroethylene-vinyl chloride copolymer, commercially available as OXY 461 from Occidental Petroleum Company, which coating was solution coated from a methyl ethyl ketone solvent. The developed image is transferred to Xerox ® 4024 paper and affixed thereto by a heated fuser roll.

This process is repeated with two-layer drums prepared as described in Examples V and VI, with substantially similar results.

EXAMPLE VIII

A two-layer drum prepared as described in Example I is made into a photoreceptor by coating the drum with a photogenerating layer comprising an azo photogenerating pigment by the process described in Example V of U.S. Pat. No. 4,797,337, the entire disclosure of said patent being totally incorporated herein by reference, wherein the photogenerating layer and charge transport layer are coated onto the conductive surface of the drum. The photoreceptor is then incorporated into an electrophotographic imaging test fixture and the imaging member is charged negatively with a corotron, followed by exposure of the charged member to a light image to form a negatively charged latent image on the member. The image is developed with a positively charged black toner as described in Example VII above and subsequently transferred and fused to Xerox ® 4024 paper.

This process is repeated with two-layer drums prepared as described in Examples III and IV, with substantially similar results.

Other embodiments and modifications of the present invention may occur to those skilled in the art subsequent to a review of the information presented herein; these embodiments and modifications, as well as equivalents thereof, are also included within the scope of this invention.

What is claimed is:

1. A process for preparing a multilayered cylindrical article which comprises
   a. introducing into a cylindrical mold a composition comprising a liquid, uncured resin material and a magnetically attractable filler material;
   b. spinning the mold about its axis;
   c. applying a magnetic field to the composition within the mold, thereby attracting the magnetically attractable filler material in the direction dictated by the magnetic field and causing the magnetically attractable filler material and the liquid uncured resin material to separate into layers; and
   d. subsequently curing the uncured resin to form a cylindrical article having at least two layers.

2. A process according to claim 1 wherein the liquid uncured resin is selected from the group consisting of isophthalic polyester resins with styrene monomer as crosslinking agent, isophthalic polyester resins with diallyl phthalate monomer as crosslinking agent, isophthalic polyester resins with vinyl toluene monomer as crosslinking agent, orthophthalic polyester resins with styrene monomer as crosslinking agent, orthophthalic polyester resins with diallyl phthalate monomer as crosslinking agent, orthophthalic polyester resins with vinyl toluene monomer as crosslinking agent, bisphenol-A methacrylate resins with styrene monomer as crosslinking agent, bisphenol-A methacrylate resins with diallyl phthalate monomer as cross inking agent, bisphenol-A methacrylate resins with vinyl toluene monomer as crosslinking agent, bisphenol-A acrylate resins with styrene monomer as crosslinking agent, bisphenol-A acrylate resins with diallyl phthalate monomer as crosslinking agent, bisphenol-A acrylate resins with vinyl toluene monomer as crosslinking agent, and mixtures thereof.

3. A process according to claim 1 wherein curing is effected by exposure to ultraviolet radiation.

4. A process according to claim 1 wherein curing is effected by heating.

5. A process according to claim 1 wherein curing is effected by activation of a catalyst.

6. A process according to claim 1 wherein the liquid uncured resin has a viscosity of from about 1 to about 100,000 centipoise.

7. A process according to claim 1 wherein the filler material has a particle size of from about 0.1 to about 5,000 microns.

8. A process according to claim 1 wherein the mold is spun at a speed of from about 10 to about 10,000 revolutions per minute.

9. A process according to claim 1 wherein the filler material contains a material selected from the group consisting of metals, magnetic metallic alloys, magnetic metallic oxides, intermetallic compounds, and mixtures thereof.

10. A process according to claim 1 wherein the filler material contains a material selected from the group consisting of nickel, iron, cobalt, steels containing tungsten, steels containing chromium, steels containing cobalt, steels containing molybdenum, alloys of nickel, aluminum, and iron, alloys of cobalt and copper, alloys of copper, nickel, and iron, alloys of copper, nickel, and cobalt, alloys of cobalt, vanadium, and iron, ferrous oxide, ferric oxide, barium ferrite, materials of the formula $R_3Fe_5O_{12}$, wherein R is a rare earth element, spinel structured ferrites of the formula $MFe_2O_4$, wherein M is a metal selected from the group consisting of nickel, manganese, magnesium, zinc, copper, cobalt, and mixtures thereof, intermetallic compounds of the formula $RCo_5$, wherein R is yttrium, lanthanum, cerium, praseodymium, or samarium, and mixtures thereof.

11. A process according to claim 1 where the magnetic field applied has a magnitude of from about 0.1 to about 1.95 Webers per square meter.

12. A process according to claim 1 wherein curing is effected by magnetic induction heating.

13. A process according to claim 1 wherein an additional layer is formed on the multilayered cylindrical article by introducing an additional material into the mold subsequent to separation of the mixture into layers and spinning the mold to form a layer of the additional material on the inside surface of the cylindrical article.

14. A process according to claim 1 wherein an additional layer is formed on the multilayered cylindrical article by first introducing an additional material into the mold prior to introduction of the mixture of at least two different materials, spinning the mold about its axis to form a layer of the additional material on the mold surface, subsequently introducing the mixture into the mold and effecting separation of the mixture into layers, thereby forming a cylindrical article having a layer of the additional material on the outer surface of the cylindrical article.

15. A process according to claim 1 wherein an additional layer is added to the multilayered cylindrical article subsequent to removal of the cylindrical article from the mold.

16. A process for preparing a multilayered cylindrical article which comprises
   a. introducing into a cylindrical mold a composition comprising a liquid, uncured resin material and a magnetically attractable filler material of a density greater than that of the uncured resin material;
   b. spinning the mold about its axis while applying a magnetic field from inside the mold to the inside diameter of the composition within the mold, thereby attracting the higher density magnetically attractable material to the inside diameter of the composition within the mold; and
   c. subsequently curing the uncured resin to form a cylindrical article having at least two layers, wherein the innermost layer comprises the magnetically attractable material of higher density.

17. A process according to claim 16 wherein the liquid uncured resin is selected from the group consisting of isophthalic polyester resins with styrene monomer as crosslinking agent, isophthalic polyester resins with diallyl phthalate monomer as crosslinking agent, isophthalic polyester resins with vinyl toluene monomer as crosslinking agent, orthophthalic polyester resins with styrene monomer as crosslinking agent, orthophthalic polyester resins with diallyl phthalate monomer as crosslinking agent, orthophthalic polyester resins with vinyl toluene monomer as crosslinking agent, bisphenol-A methacrylate resins with styrene monomer as crosslinking agent, bisphenol-A methacrylate resins with diallyl phthalate monomer as crosslinking agent, bisphenol-A methacrylate resins with vinyl toluene monomer as crosslinking agent, bisphenol-A acrylate resins with styrene monomer as crosslinking agent, bisphenol-A acrylate resins with diallyl phthalate monomer as crosslinking agent, bisphenol-A acrylate resins with vinyl toluene monomer as crosslinking agent, and mixtures thereof.

18. A process according to claim 16 wherein curing is effected by exposure to ultraviolet radiation.

19. A process according to claim 16 wherein curing is effected by heating.

20. A process according to claim 16 wherein curing is effected by activation of a catalyst.

21. A process according to claim 16 wherein the liquid uncured resin has a viscosity of from about 1 to about 100,000 centipoise.

22. A process according to claim 16 wherein the filler material has a particle size of from about 0.1 to about 5,000 microns.

23. A process according to claim 16 wherein the mold is spun at a speed of from about 10 to about 10,000 revolutions per minute.

24. A process according to claim 16 where the magnetic field applied has a magnitude of from about 0.1 to about 1.95 Webers per square meter.

25. A process according to claim 16 wherein the liquid uncured resin has a density of from about 0.9 to about 2.0 grams per milliliter.

26. A process according to claim 16 wherein the filler material has a density of from about 0.10 to about 10 grams per milliliter.

27. A process according to claim 16 wherein density of the liquid uncured resin and the density of the filler material differ by from about 0.1 to about 0.4 gram per milliliter.

28. A process according to claim 16 wherein curing is effected by magnetic induction heating.

29. A process according to claim 16 wherein an additional layer is formed on the multilayered cylindrical article by introducing an additional material into the mold subsequent to separation of the mixture into layers and spinning the mold to form a layer of the additional material on the inside surface of the cylindrical article.

30. A process according to claim 16 wherein an additional layer is formed on the multilayered cylindrical article by first introducing an additional material into the mold prior to introduction of the mixture of at least two different materials, spinning the mold about its axis to form a layer of the additional material on the mold surface, subsequently introducing the mixture into the mold and effecting separation of the mixture into layers, thereby forming a cylindrical article having a layer of the additional material on the outer surface of the cylindrical article.

31. A process according to claim 16 wherein an additional layer is added to the multilayered cylindrical article subsequent to removal of the cylindrical article from the mold.

32. A process according to claim 1 wherein at least one of the materials in the composition introduced into the cylindrical mold is a dielectric material and wherein at least one of the layers of the resulting cylindrical article is a dielectric.

33. A process according to claim 16 wherein at least one of the materials introduced into the cylindrical mold is a dielectric material and wherein at least one of the layers of the resulting cylindrical article is a dielectric.

34. A process according to claim 13 wherein the additional material comprises photogenerating material and the additional layer comprises the photogenerating material.

35. A process according to claim 34 wherein the uncured resin is at least partially cured prior to introducing the additional material comprising a photogenerating material into the mold.

36. A process according to claim 34 wherein the uncured resin is cured subsequent to introduction of the additional material comprising a photogenerating material into the mold.

37. A process according to claim 14 wherein the additional material comprises a photogenerating material and the additional layer comprises the photogenerating material.

38. A material according to claim 37 wherein the additional material comprising a photogenerating material is at least partially cured prior to introduction into the mold.

39. A process according to claim 37 wherein the additional material comprising a photogenerating material is cured subsequent to introduction into the mold.

40. A process according to claim 15 wherein the additional layer comprises a photogenerating material.

41. A process according to claim 29 wherein the additional material comprises a photogenerating material and the additional layer comprises the photogenerating material.

42. A process according to claim 41 wherein the uncured resin is at least partially cured prior to introducing the additional material comprising a photogenerating material into the mold.

43. A process according to claim 41 wherein the uncured resin is cured subsequent to introduction of the additional material comprising a photogenerating material into the mold.

44. A process according to claim 30 wherein the additional material comprises a photogenerating material and the additional layer comprises the photogenerating material.

45. A process according to claim 44 wherein the additional material comprising a photogenerating material is at least partially cured prior to introduction of the composition containing the liquid, uncured resin material and the magnetically attractable filler material into the mold.

46. A process according to claim 44 wherein the additional material comprising a photogenerating material is cured subsequent to introduction of the composition containing the liquid, uncured resin material and the magnetically attractable filler material into the mold.

47. A process according to claim 31 wherein the additional layer comprises a photogenerating material.

48. A process according to claim 1 wherein the composition comprises a liquid uncured resin selected from the group consisting of vinyl esters and unsaturated polyesters, carbon black, a metal oxide, a filler material, a polymerization initiator, and a polymerization promoter.

49. A process according to claim 1 wherein curing is effected by induction heating of the mold.

50. A process according to claim 16 wherein the composition comprises a liquid uncured resin selected from the group consisting of vinyl esters and unsaturated polyesters, carbon black, a metal oxide, a filler material, a polymerization initiator, and a polymerization promoter.

51. A process according to claim 16 wherein curing is effected by induction heating of the mold.

52. A process according to claim 32 wherein the composition comprises a liquid uncured resin selected from the group consisting of vinyl esters and unsaturated polyesters, carbon black, a metal oxide, a filler material, a polymerization initiator, and a polymerization promoter.

53. A process according to claim 32 wherein curing is effected by induction heating of the mold.

54. A process according to claim 33 wherein the composition comprises a liquid uncured resin selected from the group consisting of vinyl esters and unsaturated polyesters, carbon black, a metal oxide, a filler material, a polymerization initiator, and a polymerization promoter.

55. A process according to claim 33 wherein curing is effected by induction heating of the mold.

56. A process according to claim 36 wherein the composition comprises a liquid uncured resin selected from the group consisting of vinyl esters and unsaturated polyesters, carbon black, a metal oxide, a filler material, a polymerization initiator, and a polymerization promoter.

57. A process according to claim 36 wherein curing is effected by induction heating of the mold.

58. A process according to claim 39 wherein the composition comprises a liquid uncured resin selected from the group consisting of vinyl esters and unsaturated polyesters, carbon black, a metal oxide, a filler material, a polymerization initiator, and a polymerization promoter.

59. A process according to claim 39 wherein curing is effected by induction heating of the mold.

* * * * *